US011835950B2

(12) United States Patent
Kazemi et al.

(10) Patent No.: US 11,835,950 B2
(45) Date of Patent: Dec. 5, 2023

(54) AUTONOMOUS VEHICLE SAFE STOP

(71) Applicant: UATC, LLC, Mountain View, CA (US)

(72) Inventors: Moslem Kazemi, Allison Park, PA (US); Sameer Bardapurkar, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 64 days.

(21) Appl. No.: 17/181,733

(22) Filed: Feb. 22, 2021

(65) Prior Publication Data

US 2021/0271242 A1 Sep. 2, 2021

Related U.S. Application Data

(63) Continuation of application No. 15/995,285, filed on Jun. 1, 2018, now Pat. No. 10,962,973.

(60) Provisional application No. 62/623,815, filed on Jan. 30, 2018.

(51) Int. Cl.
| | |
|---|---|
| *G05D 1/00* | (2006.01) |
| *B60W 30/09* | (2012.01) |
| *B60W 30/095* | (2012.01) |
| *G05D 1/02* | (2020.01) |

(Continued)

(52) U.S. Cl.
CPC .............. *G05D 1/0088* (2013.01); *B60T 7/22* (2013.01); *B60W 30/09* (2013.01); *B60W 30/0953* (2013.01); *B60W 30/0956* (2013.01); *B62D 1/286* (2013.01); *G05D 1/0061* (2013.01); *G05D 1/024* (2013.01); *G05D 1/0246* (2013.01); *G05D 2201/0213* (2013.01)

(58) Field of Classification Search
CPC .... G05D 1/0088; G05D 1/0061; G05D 1/024; G05D 1/0246; G05D 2201/0213; B60T 7/22; B60W 30/09; B60W 30/0953; B60W 30/0956; B62D 1/286
See application file for complete search history.

(56) References Cited

U.S. PATENT DOCUMENTS 9,523,984 B1 * 12/2016 Herbach ............... B60W 10/18
2007/0198145 A1    8/2007 Norris et al.
(Continued)

*Primary Examiner* — Yazan A Soofi
*Assistant Examiner* — Naeem Taslim Alam
(74) *Attorney, Agent, or Firm* — Dority & Manning, P.A.

(57) ABSTRACT

Systems, methods, tangible non-transitory computer-readable media, and devices for operating an autonomous vehicle are provided. For example, the disclosed technology can include receiving state data that includes information associated with states of an autonomous vehicle and an environment external to the autonomous vehicle. Responsive to the state data satisfying vehicle stoppage criteria, vehicle stoppage conditions can be determined to have occurred. A severity level of the vehicle stoppage conditions can be selected from a plurality of available severity levels respectively associated with a plurality of different sets of constraints. A motion plan can be generated based on the state data. The motion plan can include information associated with locations for the autonomous vehicle to traverse at time intervals corresponding to the locations. Further, the locations can include a current location of the autonomous vehicle and a destination location at which the autonomous vehicle stops traveling.

22 Claims, 13 Drawing Sheets

(51) Int. Cl.
   *B60T 7/22*   (2006.01)
   *B62D 1/28*   (2006.01)

(56) References Cited

U.S. PATENT DOCUMENTS

| | | | |
|---|---|---|---|
| 2010/0299013 A1* | 11/2010 | Dolgov | G05D 1/0274 |
| | | | 701/25 |
| 2014/0049405 A1* | 2/2014 | Breuer | G01B 11/303 |
| | | | 340/905 |
| 2014/0303827 A1 | 10/2014 | Dolgov et al. | |
| 2015/0134178 A1 | 5/2015 | Minoiu-Enache | |
| 2016/0311423 A1* | 10/2016 | Storm | B60L 7/08 |
| 2018/0141545 A1* | 5/2018 | Freytag | B60W 50/0098 |
| 2019/0095725 A1* | 3/2019 | Kalghatgi | G06V 20/59 |
| 2019/0168805 A1* | 6/2019 | Siskoy | B60T 7/22 |
| 2019/0187699 A1* | 6/2019 | Salour | G05D 1/0246 |

\* cited by examiner

AUTONOMOUS VEHICLE SAFE STOP

RELATED APPLICATION

The present application is a continuation of U.S. patent application Ser. No. 15/995,285, having a filing date of Jun. 1, 2018, which is based on and claims benefit of U.S. Provisional Patent Application No. 62/623,815 having a filing date of Jan. 30, 2018. Applicant claims priority to and the benefit of each of such applications and incorporates all such applications herein by reference in its entirety.

FIELD

The present disclosure relates generally to the operation of an autonomous vehicle including the guidance of a vehicle to a stop based on a motion plan.

BACKGROUND

The operation of vehicles, including autonomous vehicles, can involve a variety of changes in the state of the vehicle, some of which are based on changes in the environment proximate to the vehicle. For example, an autonomous vehicle can traverse an environment in such a way that contact with static objects in the environment is avoided. Further, in response to moving objects, an autonomous vehicle can dynamically change its course to avoid contacting those objects.

However, the state of the vehicle and the environment are constantly changing and can be difficult to predict. Further, improving the operational safety of an autonomous vehicle may necessitate rapid changes in the path of an autonomous vehicle. Accordingly, there exists a demand for a way to more effectively change how an autonomous vehicle interacts with the environment including interactions in which a planned path of the autonomous vehicle is modified.

SUMMARY

Aspects and advantages of embodiments of the present disclosure will be set forth in part in the following description, or may be learned from the description, or may be learned through practice of the embodiments.

An example aspect of the present disclosure is directed to a computer-implemented method of autonomous vehicle operation. The computer-implemented method can include receiving, by a computing system including one or more computing devices, state data including information associated with one or more states of an autonomous vehicle or one or more states of an environment external to the autonomous vehicle. The method can include, responsive to the state data satisfying one or more vehicle stoppage criteria, determining, by the computing system, that one or more vehicle stoppage conditions have occurred in the autonomous vehicle or the environment external to the autonomous vehicle. The method can include selecting, by the computing system, based at least in part on the state data, a severity level of the one or more vehicle stoppage conditions from a plurality of available severity levels. Each available severity level of the plurality of available severity levels can be associated with a different set of respective constraints. Furthermore, the method can include generating, by the computing system, based at least in part on the state data, a motion plan that complies with the set of respective constraints associated with the severity level. The motion plan can include information associated with one or more locations for the autonomous vehicle to traverse over one or more time intervals corresponding to the one or more locations. Further, the one or more locations can include a current location of the autonomous vehicle and a destination location at which the autonomous vehicle will stop traveling.

Another example aspect of the present disclosure is directed to a computing system, that includes one or more processors; a machine-learned model trained to receive an input including data and, responsive to receiving the input, generate an output including information associated with an occurrence of one or more vehicle stoppage conditions in an autonomous vehicle or an environment external to the autonomous vehicle; and a memory comprising one or more computer-readable media, the memory storing computer-readable instructions that when executed by the one or more processors cause the one or more processors to perform operations. The operations can include receiving state data including information associated with one or more states of an autonomous vehicle and one or more states of an environment external to the autonomous vehicle. The operations can also include sending the state data to the machine-learned model. The operations can include receiving output including the information associated with the occurrence of one or more vehicle stoppage conditions from the machine-learned model. The one or more vehicle stoppage conditions can describe a severity level of the one or more vehicle stoppage conditions selected from a plurality of available severity levels. Each available severity level of the plurality of available severity levels can be associated with a different set of respective constraints. Furthermore, the operations can include generating, based at least in part on the output including the information associated with the occurrence of one or more vehicle stoppage conditions from the machine-learned model, a motion plan that complies with the set of constraints associated with the severity level. The motion plan can include information associated with one or more locations for the autonomous vehicle to traverse over one or more time intervals corresponding to the one or more locations. Further, the one or more locations can include a current location of the autonomous vehicle and a destination location at which the autonomous vehicle will stop traveling.

Another example aspect of the present disclosure is directed to an autonomous vehicle including one or more processors and a memory including one or more computer-readable media. The memory can store computer-readable instructions that when executed by the one or more processors can cause the one or more processors to perform operations. The operations can include receiving state data including information associated with one or more states of an autonomous vehicle or an environment external to the autonomous vehicle. The operations can include, responsive to the state data satisfying one or more vehicle stoppage criteria, determining that one or more vehicle stoppage conditions have occurred in the autonomous vehicle or the environment external to the autonomous vehicle. The operations can also include determining, based at least in part on the state data, a severity level of the one or more vehicle stoppage conditions from a plurality of available severity levels. Each available severity level of the plurality of available severity levels can be associated with a different set of respective constraints. Furthermore, the operations can include generating, based at least in part on the state data, a motion plan that complies with the set of respective constraints associated with the severity level. The motion plan can include information associated with one or more locations for the autonomous vehicle to traverse over one or more time intervals corresponding to the one or more locations. The one or more locations can include a current location of the autonomous vehicle and a destination location at which the autonomous vehicle will stop traveling.

Other example aspects of the present disclosure are directed to other systems, methods, vehicles, apparatuses, tangible non-transitory computer-readable media, and devices for autonomous vehicle operation. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
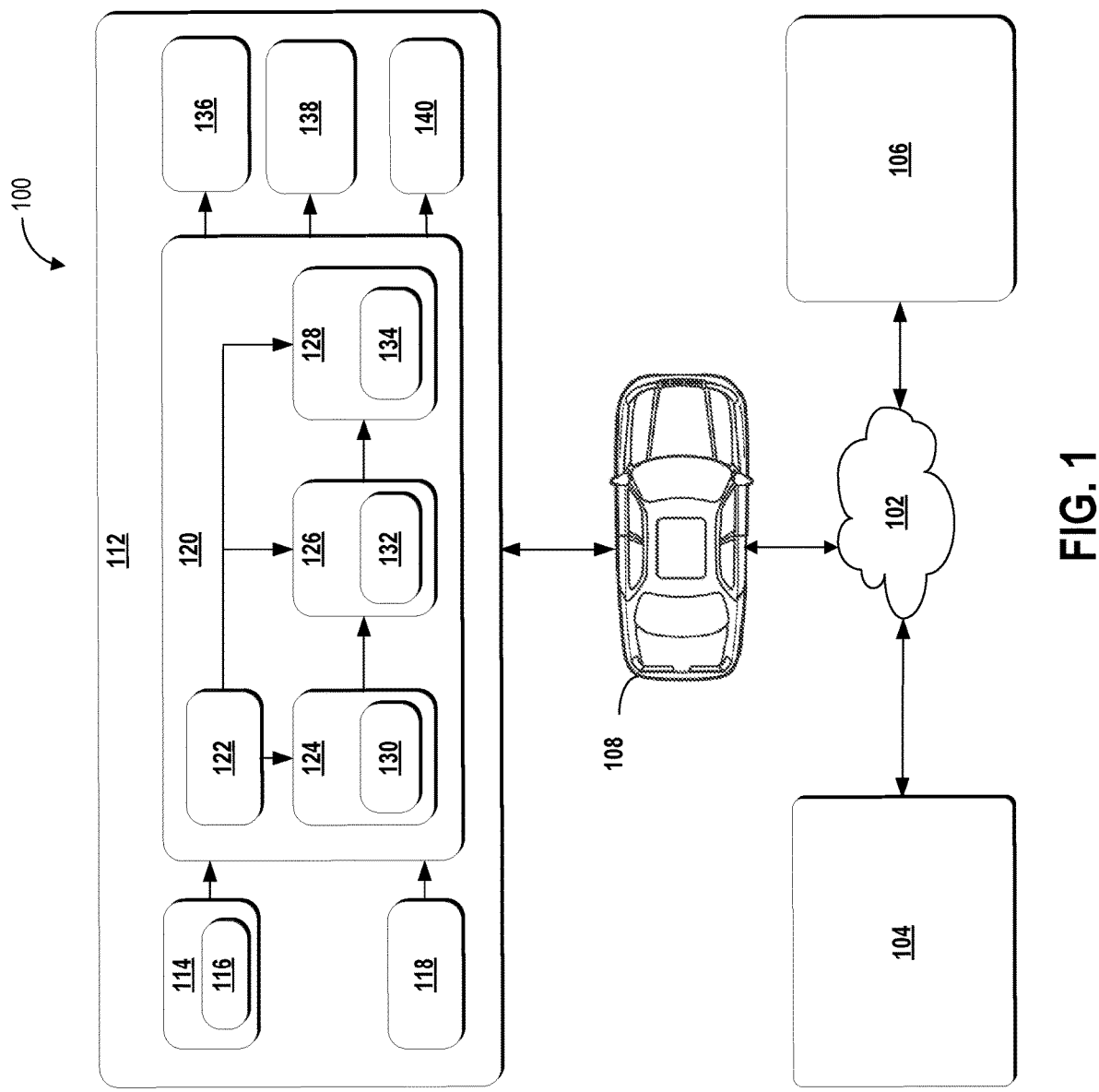
FIG. 1 depicts an example system according to example embodiments of the present disclosure.

Example aspects of the present disclosure are directed to bringing a vehicle (e.g., an autonomous vehicle, a semi-autonomous vehicle, or a manually operated vehicle) to a stop in a safe manner. In particular, aspects of the present disclosure include a computing system (e.g., a vehicle computing system including one or more computing devices that can be configured to monitor and/or control one or more vehicle systems) that can receive data associated with the state of the vehicle (e.g., state data including a velocity, an acceleration, and/or a trajectory of the vehicle and/or the operational status of various components or systems of the vehicle) and the state of the environment external to the vehicle (e.g., the location, size, and/or position of roads, vehicles, buildings, and/or pedestrians); determine the occurrence of vehicle stoppage conditions under which the vehicle should be brought to a stop; select, based on the state data, a severity level of the one or more vehicle stoppage conditions from a plurality of available severity levels; generate data (e.g., motion plan data in the form of a data structure including information associated with a motion plan for the vehicle) that can be used to determine a safe path for the vehicle to travel before stopping (e.g., a path that safely brings the vehicle to a stop and ends at a safe stopping location); and activate vehicle systems (e.g., engines, steering, and/or brakes) to execute the motion plan and bring the vehicle to a stop.

By way of example, a vehicle computing system can receive state data including information associated with one or more vehicle systems (e.g., the state data can indicate various vehicle states including vehicle fuel level, engine state, brake state, sensor state, and/or vehicle tire pressure) and information associated with the state of the environment external to the vehicle. The information associated with the state of the environment external to the vehicle can be received from one or more sensors (e.g., one or more light detection and ranging sensors (LIDAR), image sensors, radar devices, and/or sonar devices that detect the environment external to the vehicle) of the vehicle. The information received from the one or more sensors can be updated over time and as the vehicle travels through the environment (e.g., as the vehicle travels along a highway).

Further, the vehicle computing system can utilize various vehicle stoppage determination techniques (e.g., rules based techniques and/or techniques using a machine-learned model) to determine when vehicle stoppage conditions occur (e.g., a passenger door is opened as the vehicle travels at high velocity) and that a motion plan to stop the vehicle will be generated. The motion plan generated by the vehicle computing system can include locations that the vehicle will traverse before stopping, time information associated with the time the vehicle will be at a location, and vehicle characteristics (e.g. velocity, acceleration, and/or trajectory) of the vehicle as the vehicle traverses the locations.

Furthermore, the vehicle computing system can analyze various characteristics of the vehicle and the environment surrounding the vehicle to determine the type of situation the vehicle is in, and the type of motion plan that will be generated to most effectively handle the situation. For example, the vehicle computing system can generate a motion plan based on a severity associated with the occurrence of a vehicle stoppage condition. Further, the severity of the vehicle stoppage conditions can be divided into multiple severity levels including for example multiple severity levels of ascending or descending severity. For example, the multiple severity levels can include four severity levels of descending severity: L0, L1, L2, and L3.

The first severity level (L0) can be associated with the highest level of severity of vehicle stoppage conditions including vehicle stoppage conditions in which the vehicle must come to an immediate stop (e.g., a hard stop using maximum braking force) without performing any additional maneuvers (e.g., changing lanes). For example, L0 can be associated with the vehicle coming to a stop when a passenger door of the vehicle opens when the vehicle is travelling eighty kilometers per hour. Furthermore, L0 can be associated with the vehicle stopping immediately, irrespective of the stopping location. For example, a vehicle stop associated with L0 can occur in the middle of an intersection or at the entrance of a tunnel or driveway.

The second severity level (L1) can be associated with a second highest level of severity for vehicle stoppage conditions including vehicle stoppage conditions in which the vehicle must come to a near immediate stop (e.g., stopping the vehicle when an emergency vehicle is in close proximity to the vehicle) without changing the trajectory of the vehicle (e.g., not rerouting the vehicle path, changing lane, or guiding the vehicle to a road shoulder). For example, the vehicle can stop within the lane in which it was travelling in order to give an approaching ambulance the right of way. Further, L1 can be associated with the vehicle stopping in a location that does not block or otherwise obstruct the movement of other vehicles (e.g., the vehicle can avoid stopping in an intersection or at the entrance of a tunnel or driveway). For example, L1 can be associated with the vehicle stopping before entering an intersection or, when the vehicle is already in an intersection, guiding the vehicle through to the other side of the intersection.

The third severity level (L2) can be associated with an intermediate level of severity for vehicle stoppage conditions. L2 can include vehicle stoppage conditions in which the vehicle does not have to come to an immediate or near-immediate stop and can travel to a nearby (e.g., within a specified distance range) location to stop within an intermediate time period (e.g., twenty seconds) or an intermediate distance (e.g., within fifty meters of the current location of the vehicle). Further, L2 can be associated with guiding a vehicle to a permissible location (e.g., a stopping location within a predetermined distance to which the vehicle can travel and stop without obstructing other vehicles) in a leftmost or rightmost lane relative to the vehicle's current location. In some embodiments, L2 can be associated with guiding the vehicle to a stopping location (e.g., a road shoulder) by performing lane changes. For example, the vehicle computing system can determine that a tire of the vehicle has been punctured, which will result in a determination of an L2 severity and a motion plan that includes the vehicle performing lane changes and leaving the road to traveling to a road shoulder location within the next twenty seconds.

The fourth severity level (L3) can be associated with a lowest level of severity for vehicle stoppage conditions including vehicle stoppage conditions in which the vehicle may not need to stop immediately and which can include a modification to a current motion plan of the vehicle that takes the vehicle to a different destination location in a non-emergency situation. Furthermore, L3 can be associated with an autonomy system of the vehicle determining a set of locations at which the vehicle can stop (e.g., locations that do not obstruct other vehicles) and guiding the vehicle to stop at the nearest location of the set of locations. For example, slightly low tire pressure that may take hours or days to develop into an issue (e.g., a flat tire) can trigger an L3 severity level that results in a motion plan including determining the locations of automotive service stations within fifty kilometers of the vehicle and guiding the vehicle to the nearest automotive service station (e.g., an automotive service station with an air pump) six kilometers away from the vehicle's current location.

Determination of the severity level can be based on analysis of a set of conditions (e.g., one or more conditions in an environment proximate to the vehicle) that are subject to one or more constraints (e.g., whether a vehicle path is obstructed by one or more objects) that can be used to constrain a search space used to determine a vehicle path for inclusion in a motion plan. Further, the vehicle computing system can use one or more cost functions to determine various outputs including a minimum stopping distance for the vehicle.

Accordingly, the disclosed technology can result in a vehicle computing system that can more effectively generate a motion plan to more optimally stop the vehicle. The benefits and advantages of the disclosed technology include improved vehicle stoppage safety (e.g., greater safety for vehicle passengers and other vehicles), enhanced traffic flow (e.g., less disruption of traffic flow as a result of stopping the vehicle in a less disruptive location), and more effective vehicle operation and management (e.g., guiding the vehicle to a more suitable and/or convenient location from which to resolve a vehicle issue or wait for assistance). As such, the disclosed technology provides numerous overall benefits to the operation of a vehicle and the passenger experience.

The disclosed technology can include a vehicle computing system (e.g., one or more computing devices that includes one or more processors and a memory) that can process, generate, and/or exchange (e.g., send and/or receive) signals or data, including signals or data exchanged with various devices including one or more vehicles, vehicle components (e.g., engine, brakes, steering, and/or transmission), and/or remote computing devices (e.g., one or more smart phones, laptop computing devices, tablet computing devices, and/or wearable devices).

For example, the vehicle computing system can exchange one or more signals (e.g., electronic signals) or data with one or more vehicle systems including vehicle access systems (e.g., one or more door, window, sunroof, and/or trunk systems); illumination systems (e.g., headlights, internal lights, signal lights, and/or tail lights); sensor systems that can generate output based on the state of the vehicle and/or the physical environment external to the vehicle and which can include one or more LIDAR devices, cameras, tactile sensors, microphones, radar devices, and/or sonar devices; communication systems (e.g., wired or wireless communication systems that can exchange signals or data with other devices); navigation systems (e.g., devices that can receive signals from GPS, GLONASS, or other systems used to determine a vehicle's geographical location); notification systems (e.g., devices used to provide notifications to passengers of the vehicle, including one or more display devices, status indicator lights, and/or audio output systems); braking systems (e.g., brakes of the vehicle including mechanical and/or electric brakes); propulsion systems (e.g., motors and/or engines including internal combustion engines or electric engines); and/or steering systems used to change the trajectory, path, course, or direction of travel of the vehicle.

The vehicle computing system can receive state data which can include information associated with one or more states of a vehicle and/or one or more states of an environment external to the vehicle. For example, the vehicle computing system can include one or more components (e.g., interconnects, transmitters, and/or receivers) that are configured to send and/or receive one or more signals (e.g., signals transmitted wirelessly and/or via wire) that include state data. The state data can be based at least in part on one or more states of a vehicle (e.g., physical states based on the vehicle's location, motion, and/or states of the vehicle's associated vehicle systems) and the environment external to the vehicle which can be based at least in part on one or more sensor outputs from one or more sensors (e.g., one or more cameras, LIDAR devices, sonar devices, and/or microphones) that can detect the state of the environment.

For example, the state data can include data associated with a velocity of the vehicle, an acceleration of the vehicle; a trajectory of the vehicle; a current geographic location of the vehicle (e.g., a latitude and longitude of the vehicle); an incline angle of the vehicle relative to the ground; a vehicle door state (e.g., whether a door is open or closed); a vehicle window state (e.g., whether a window is open or closed); a vehicle engine or vehicle motor state (e.g., data associated with whether the engine or motor is operating normally); an autonomy system state (e.g., data associated with the state of the autonomy system); and or a vehicle tire state (e.g., tire pressure).

Further, the state data can include one or more states of the environment external to the vehicle. The one or more states of the environment external to the vehicle can include one or more spatial relations including the location and/or position of one or more objects, the physical dimensions of one or more objects, and an identity of one or more objects (e.g., whether an object is a building, a vehicle, a road surface, a road marking, a road sign, and/or a pedestrian).

Responsive to the state data satisfying one or more vehicle stoppage criteria, the vehicle computing system can determine whether, that, or if, one or more vehicle stoppage conditions have occurred in the vehicle and/or the environment external to the vehicle. Satisfying the one or more vehicle stoppage criteria can include the vehicle computing system comparing the state data (e.g., one or more attributes, parameters, and/or values of the state data) to the one or more vehicle stoppage criteria which can include one or more corresponding attributes, parameters, and/or values. For example, the state data can include data associated with the vehicle systems of the vehicle including mechanical systems and/or electrical systems. The data associated with the state of the vehicle systems can be compared to one or more vehicle stoppage criteria including one or more normal operational states that can be used to determine if the vehicle systems are operating within a range of normal operation (e.g., the vehicle systems are not operating in a way that is defective or malfunctioning). Accordingly, satisfying the one or more vehicle stoppage criteria can include the state of the vehicle systems being within one or more corresponding ranges of normal operation.

The vehicle computing system can determine, based at least in part on the state data, a severity level of the one or more vehicle stoppage conditions. For example, the vehicle computing system can use the state data including one or more spatial relations of the vehicle with respect to one or more objects in the environment (e.g., the vehicle being in the path of an ambulance) and/or one or more sound states in the environment external to the vehicle (e.g., the sound of an ambulance siren) to determine that the severity level of the one or more stoppage conditions is high.

Further, the severity level can be associated with a set of constraints including one or more time constraints (e.g., a time duration within which the vehicle will come to a stop), one or more distance constraints (e.g., a distance range within which the vehicle will come to a stop), one or more trajectory change constraints (e.g., an amount by which the trajectory of the vehicle can change before the vehicle stops), and/or one or more location constraints (e.g., areas where the vehicle is constrained from stopping). Further, the severity level of the one or more vehicle stoppage conditions can correspond to, or be associated with, a motion plan that is generated by the vehicle computing system. For example, the severity level of the one or more vehicle stoppage conditions can be associated with the one or more locations and/or one or more time intervals that the vehicle computing system will generate for the motion plan.

In some embodiments, the vehicle computing system can select the severity level of the one or more vehicle stoppage conditions from a plurality of severity levels (e.g., available severity levels including, for example, L1, L2, and L3 as described elsewhere herein). A plurality of sets of constraints (e.g., different sets of constraints) can be respectively associated with the plurality of available severity levels. For example, the set of constraints for the highest level of severity can include a time constraint (e.g., the vehicle will stop within the shortest duration of time) and/or a trajectory change constraint (e.g., the vehicle does not change trajectory before stopping). Likewise, each different severity level can have its own set of constraints associated therewith.

In some embodiments, the vehicle computing system can execute or run an internal vehicle diagnostic (e.g., a diagnostic of one or more vehicle systems in the vehicle) that can perform one or more operations including determining one or more states of one or more vehicle systems. In some embodiments, the state data can include data associated with the internal vehicle diagnostic. Further, the vehicle computing system can access data (e.g., access data in a lookup table) including severity level data that includes one or more states of the vehicle (e.g., vehicle systems states) and one or more corresponding severity levels. The severity level data can be used to select the severity level that corresponds (or corresponds most closely) to the one or more states of the one or more vehicle systems.

The vehicle computing system can generate data that can be based at least in part on the state data, and can include a motion plan. The motion plan can include information associated with one or more locations for the vehicle to traverse (e.g., travel to) over one or more time intervals (e.g., the one or more intervals are based on a longer duration of time being divided into several shorter periods of time) that can correspond to the one or more locations (e.g., a location of the vehicle at each of the one or more time intervals). The one or more intervals can be of equal duration (e.g., all of the one or more time intervals are of the same duration) or unequal duration (e.g., some or all of the one or more time intervals are of different duration).

Further, the one or more locations can include a current location of the vehicle (e.g., the current geographic location of the vehicle or location of the vehicle relative to an object in the environment) and a destination location at which the vehicle will stop traveling (e.g., the last location of the one or more locations). The motion plan can also include data associated with a timing of activating one or more vehicle systems when the motion plan is executed (e.g., a time interval when brakes are applied or a time interval when the vehicle is steered in a particular direction).

More particularly, according to an aspect of the present disclosure, the vehicle computing system can generate a motion plan that complies with the set of constraints associated with the selected severity level.

In some embodiments, generating the motion plan that complies with the set of constraints can include modifying a total cost function to include one or more additional cost functions that respectively enforce the set of constraints associated with the severity level that was selected. For example, the cost produced by a total cost function may be a summation of the costs produced by one or more additional cost functions including a cost function for proximity to an object (e.g., cost increases as proximity to an object decreases) and a cost function for distance to a destination location (e.g., cost increases as distance to the destination location increases).

Thus, to provide one simplified example, an L1 severity level may have an associated constraint that requires that the vehicle come to a stop within a current lane and within a threshold distance. To enforce this constraint, the vehicle computing system can introduce a new cost function into the motion planning process, where the cost function provides a greatly increased cost if the vehicle leaves the current lane or passes the threshold distance. In some instances this can be referred to as a "stop fence." More generally, however, various additional cost functions can be used and/or introduced to result in the produced motion plan satisfying various constraints. In some embodiments, to provide the appropriate cost functions for the particular severity level, the vehicle computing system can control a scenario generator to operate according to a particular scenario that corresponds to a particular severity level, where the scenario generator is responsible for providing the cost functions used by the motion planning system.

In some embodiments, generating the motion plan that complies with the set of constraints can include constraining a search space over which a motion planning system optimizes a total cost function. For example, constraining the search space can include constraining the area (e.g., a radius around the vehicle or a set of locations within an area) within which the vehicle will travel when the motion plan is executed. As one example, in some embodiments, the motion plan can be generated by an iterative optimizer that iteratively generates, evaluates, and modifies candidate motion plans on the basis of total cost (e.g., as provided by the total cost function). In some of such embodiments, generating the motion plan that complies with the set of constraints can include controlling the iterative optimizer so that only motion plans within a particular search space (e.g., that traverse a particular geographic area) are generated and evaluated.

In some embodiments, generating the motion plan that complies with the set of constraints can include modifying the destination location to comply with the set of constraints and generating the motion plan to the destination location. As one example, generating the motion plan that complies with the set of constraints can include modifying the destination location to a nearest safe stop location that is outside a flow of traffic (e.g., a nearest shoulder location). As another example, a destination location can be modified to comply with a set of constraints associated with one or more objects that obstruct the vehicle. The destination location can be modified so that the vehicle does not come into contact with the one or more objects. The motion plan can then be generated to include a path from the vehicle's current location to the destination location that was modified in accordance with the set of constraints.

In some embodiments, determining a severity level of the one or more vehicle stoppage conditions or selecting the severity level of the one or more vehicle stoppage conditions from the plurality of available severity levels can include and/or be based on determining one or more motion characteristics of the vehicle (e.g., the location of the vehicle at each of the time intervals can be used to determine various motion characteristics of the vehicle including the velocity, acceleration, and/or trajectory of the vehicle). The one or more motion characteristics can include various characteristics associated with the motion of the vehicle through an environment including a velocity of the vehicle, an acceleration of the vehicle, and/or trajectory of the vehicle. For example, the severity level of vehicle stoppage conditions for a vehicle stopping at a destination location with a loose gravel surface within thirty meters can be greater when the vehicle is traveling at a velocity of eighty kilometers per hour than when the vehicle is traveling at a velocity of thirty kilometers per hour.

In some embodiments, the severity level of the one or more vehicle stoppage conditions can be inversely proportional to one or more motion planning characteristics (e.g., values associated with the one or more vehicle stoppage conditions that increase when values associated with the one or more motion planning characteristics decrease, or values associated with the one or more vehicle stoppage conditions that decrease when values associated with the one or more motion planning characteristics increase). The one or more motion planning characteristics can include the one or more motion characteristics, a distance between the current location of the vehicle and the destination location, an amount of change in the velocity of the vehicle over the one or more time intervals, an amount of change in the acceleration of the vehicle over the one or more time intervals, and/or an amount of trajectory change (e.g., an amount or extent of change in the trajectory, orientation, path, or bearing) by the vehicle over the one or more time intervals. Further, in some embodiments one or more of the motion planning characteristics can be weighted more heavily so that certain motion planning characteristics contribute more to the severity level of the one or more vehicle stoppage conditions than other motion planning characteristics.

The vehicle computing system can determine an aggregate duration of the one or more time intervals (e.g., the sum total duration of the one or more time intervals). In some embodiments, the severity level of the one or more vehicle stoppage conditions can correspond at least in part to the aggregate duration of the one or more time intervals of the motion plan. Further, in some embodiments, the severity level of the one or more vehicle stoppage conditions can be inversely proportional to the aggregate duration of the one or more time intervals of the motion plan. For example, as the severity level increases the aggregate duration of the one or more time intervals decreases and as the severity level decreases the aggregate duration of the one or more time intervals increases.

The vehicle computing system can determine, based at least in part on the state data, a plurality of paths the vehicle is capable of traversing from the current location of the vehicle within the aggregate duration of the one or more time intervals. The traversal of each of the plurality of paths can include stopping at a terminal location of each of the plurality of paths (e.g., each path can include a sequence of locations and the vehicle can stop at the last location of each path). For example, the vehicle computing system can determine that a tire of the vehicle has been punctured as the vehicle travels at a velocity of eighty kilometers per hour. The vehicle computing system can then determine that the aggregate duration of the one or more time intervals for the vehicle to come to a stop is thirty seconds. Based on an estimated deceleration of the vehicle and the availability of locations to stop the vehicle, the vehicle can determine the plurality of paths that the vehicle can traverse.

In some embodiments, generating the motion plan (e.g., the motion plan that complies with the set of constraints associated with the severity level) can include determining at least one path of the plurality of paths the vehicle is capable of traversing from the current location of the vehicle within the aggregate duration of the one or more time intervals.

The vehicle computing system can determine a ranking of the plurality of paths based at least in part on one or more path criteria associated with one or more adverse conditions for the vehicle to avoid. For example, the vehicle computing system can analyze each of the plurality of paths based in part on the one or more path criteria. Analyzing each of the plurality of paths can include determining which of the plurality of paths include the one or more adverse conditions and/or the extent to which each of the one or more adverse conditions is present in each of the plurality of paths.

The plurality of paths can then be ranked (e.g., arranged in an ascending or descending order according to the extent to which the one or more path criteria that are satisfied). In some embodiments, generating the motion plan (e.g., the motion plan that complies with the set of constraints associated with the severity level) can include determining a path of the plurality of paths that has the ranking that is highest (i.e., the highest ranking path of the plurality of paths). In some embodiments, the one or more adverse conditions can include a road with a direction of travel opposite to a direction of travel of the vehicle, an intersection (e.g., an area in which two or more roads intersect), a railroad crossing, a public transportation pick-up area (e.g., a bus stop), a blind curve (e.g., a curve around which there is no visibility or around which visibility is limited), a blind corner (e.g., a corner around which there is no visibility or around which visibility is limited), an on-ramp for a highway, and/or an off-ramp for a highway.

The vehicle computing system can determine a minimum deviation path of the plurality of paths. The minimum deviation path can be the path of the plurality of paths including a least amount of change to a velocity, acceleration, and/or trajectory of the vehicle. For example, the vehicle computing system can determine the path of the plurality of paths that involves the minimum amount of deceleration, thereby resulting in a more comfortable stop for passengers of the vehicle. In some embodiments, generating the motion plan (e.g., generating the motion plan that complies with the set of constraints associated with the severity level) can include determining the minimum deviation path.

The vehicle computing system can determine one or more path characteristics for each of the plurality of paths. Determining the one or more path characteristics can be based at least in part on the state data. The one or more path characteristics can include various aspects, attributes, and/or characteristics of the plurality of paths including a path angle, a path grade, a path width, a path surface type, a path condition (e.g., snow covered or dry), a curb size (e.g., the height and/or width of a curb), a path shoulder size, and/or a path shoulder type. For example, the vehicle computing system can determine various path characteristics including physical dimensions of the path (e.g., distance of the path and/or width of the path) and/or properties of the path (e.g., whether a path is wet, dry, paved or unpaved). In some embodiments, generating the motion plan (e.g., generating the motion plan that complies with the set of constraints associated with the severity level) can include determining the one or more path characteristics.

Responsive to all of the plurality of paths being obstructed (e.g., blocked and/or inaccessible), the vehicle computing system can determine, based at least in part on the state data, a hard stop time duration for the vehicle to stop without changing a trajectory of the vehicle. In some embodiments, the hard stop time duration can be based in part on the severity level of the one or more vehicle stoppage conditions. For example, the vehicle computing system can determine that the vehicle is obstructed on all sides by other vehicles and that the vehicle will not change trajectory (e.g., not turn) and will stop within a hard stop time duration based in part on the severity level of the one or more vehicle stoppage conditions (e.g., the severity level can increase in relation to, or proportional to, the velocity of the vehicle and/or the other vehicles obstructing the vehicle). In some embodiments, generating the motion plan (e.g., generating the motion plan that complies with the set of constraints associated with the severity level) can include determining, based at least in part on the state data, that the vehicle will stop without changing trajectory within the hard stop time duration.

Responsive to all of the plurality of paths not being obstructed (i.e., at least one of the plurality of paths is not obstructed), the vehicle computing system can determine, based at least in part on the state data, a path of the plurality of paths that includes an area of a predetermined size at which the vehicle can stop. For example, the vehicle computing system can determine that two paths of the plurality of paths are not obstructed and that an area of predetermined size for the vehicle is four meters wide and five meters long. Further, the vehicle computing system can determine that one of the two paths is in a tunnel with walls on both sides and no road shoulder, and the other path is on an open road with a road shoulder that has a stopping area six meters wide by ten meters long (which exceeds the predetermined size of four meters width and five meters long) and immediately adjacent to the road. In some embodiments, generating the motion plan (e.g., generating the motion plan that complies with the set of constraints associated with the severity level) can include determining, based at least in part on the state data, the path of the plurality of paths that includes an area of predetermined size at which the vehicle can stop.

The vehicle computing system can determine, based at least in part on the state data, an operational state of an autonomy system of the vehicle. For example, the vehicle computing system can run a diagnostic to determine the state of the vehicle's autonomy system and based on the results of the diagnostic, determine whether the vehicle's autonomy system is operating normally (e.g., without errors, defects, and/or malfunctions). In some embodiments, satisfying the one or more vehicle stoppage criteria can include determining that the operational state of the autonomy system is a non-malfunctioning operational state.

The vehicle computing system can activate, based at least in part on the motion plan, one or more vehicle systems associated with operation of the vehicle. Further, the one or more vehicle systems can include one or more engine systems, one or more motor systems, one or more steering systems, one or more braking systems, one or more electrical systems, one or more vehicle access systems, one or more vehicle storage systems, and/or one or more lighting systems.

By way of example, the vehicle computing system can, activate one or more vehicle systems including notification systems (e.g., displaying a message on an in-vehicle interface to indicate that the vehicle is traveling to the side of the road to await assistance for a mechanical issue); illumination systems (e.g., turning on hazard lights when the vehicle pulls over to the side of the road); communication systems (e.g., generating a request for remote vehicle assistance); braking systems (e.g., applying the vehicle's brakes when a door of the vehicle is opened during vehicle transit); propulsion systems (e.g., reducing the vehicle's velocity when the vehicle travels to a parking area); and/or steering systems (e.g., steering the vehicle to the side of the road).

In some embodiments, the vehicle computing system can include a machine-learned model (e.g., a machine-learned vehicle and environment state model) that is trained to receive state data associated with the state of a vehicle and/or the state of an environment external to the vehicle. Responsive to receiving the state data, the machine-learned model can generate an output that can include information associated with the occurrence of one or more vehicle stoppage conditions (e.g., a set of conditions associated with bringing the vehicle to a stop) that can be used to generate a motion plan. The motion plan can include information associated with one or more locations for the autonomous vehicle to traverse and the one or more locations can include a current location of the autonomous vehicle and a destination location at which the autonomous vehicle stops. The state data can also include data from one or more sensors associated with a vehicle.

Furthermore, the state data can include information associated with one or more states of objects including a vehicle (e.g., vehicle velocity, vehicle acceleration, vehicle trajectory, one or more vehicle system states, and/or a vehicle path) and one or more states of an environment (e.g., one or more states of the environment detectable by one or more sensors including one or more cameras, microphones, LIDAR, sonar devices, and/or radar devices) external to the vehicle which can include one or more objects (e.g., pedestrians, vehicles, cyclists, buildings, roads, and/or waterways).

The state data can be sent to the machine-learned model, which can process the state data and generate an output (e.g., classified sensor outputs). The vehicle computing system can generate, based at least in part on output from the machine-learned model, data and/or information associated with the occurrence of one or more vehicle stoppage conditions s that can be associated with the state of the vehicle (e.g., vehicle location, velocity, acceleration, and/or trajectory) and one or more detected states (e.g., detected by one or more vehicle sensors) of the environment external to the vehicle including one or more spatial relations between the vehicle and one or more objects in the environment including other vehicles, pedestrians, buildings, and roads. In some embodiments, the vehicle computing system can activate one or more vehicle systems (e.g., one or more motors, engines, brakes, and/or steering) based at least in part on the data and/or information associated with the occurrence of one or more vehicle stoppage conditions.

The vehicle computing system can access a machine-learned model that has been generated and/or trained in part using training data including a plurality of classified features and a plurality of classified object labels. In some embodiments, the plurality of classified features can be extracted from one or more images and/or LIDAR point cloud data, each of which includes a representation of one or more states of the environment (e.g., the physical dimensions, location, velocity, acceleration, and/or trajectory of one or more objects in the environment) in which the representation is based at least in part on output from one or more sensor devices (e.g., one or more LIDAR devices, sonar devices, and/or cameras). Furthermore, in some embodiments, the plurality of classified features can be associated with one or more states of the vehicle (e.g., the vehicle's velocity, acceleration, trajectory, location, angle of incline, remaining fuel, tire pressure, engine state, brake state, steering state, and/or electrical state).

When the machine-learned model has been trained, the machine-learned model can associate the plurality of classified features with one or more classified object labels that are used to classify or categorize objects including objects that are not included in the plurality of training objects (e.g., images and/or LIDAR point cloud data associated with objects in areas not included in the plurality of training objects that can be recognized using the machine-learned model).

In some embodiments, as part of the process of training the machine-learned model, the differences in correct classification output between a machine-learned model (that outputs the one or more classified object labels) and a set of classified object labels associated with a plurality of training objects that have previously been correctly identified (e.g., ground truth labels), can be processed using an error loss function that can determine a set of probability distributions based on repeated classification of the same plurality of training objects. As such, the effectiveness (e.g., the rate of correct identification of objects) of the machine-learned model can be improved over time.

The vehicle computing system can access the machine-learned model in a variety of ways including exchanging (sending and/or receiving via a network) data or information associated with a machine-learned model that is stored on a remote computing device; and/or accessing a machine-learned model that is stored locally (e.g., in one or more storage devices of the vehicle).

The plurality of classified features can be associated with one or more values that can be analyzed individually and/or in various aggregations. Analysis of the one or more values associated with the plurality of classified features can include determining a mean, mode, median, variance, standard deviation, maximum, minimum, and/or frequency of the one or more values associated with the plurality of classified features. Further, processing and/or analysis of the one or more values associated with the plurality of classified features can include comparisons of the differences or similarities between the one or more values. For example, the one or more spatial relations between a vehicle and the surrounding environment in which the vehicle is obstructed by other vehicles and cannot proceed can be associated with a range of LIDAR and sonar outputs that are different from the range of LIDAR and sonar outputs associated with a vehicle that can proceed to a roadside stopping location.

In some embodiments, the plurality of classified features can include a range of moisture levels associated with the training objects, a range of slipperiness levels associated with the plurality of training objects, a range of traction levels and/or friction levels associated with the plurality of training objects, a range of sounds associated with the plurality of training objects, a range of temperatures associated with the plurality of training objects, a range of velocities associated with the plurality of training objects, a range of accelerations associated with the plurality of training objects, a range of trajectories and/or orientations associated with the plurality of training objects, a range of colors associated with the plurality of training objects, a range of shapes associated with the plurality of training objects, and/or physical dimensions (e.g., length, width, and/or height) of the plurality of training objects.

The plurality of classified features can be based at least in part on the output from one or more sensors that have captured a plurality of training objects (e.g., actual objects used to train the machine-learned model) from various angles and/or distances in different environments (e.g., urban areas, suburban areas, streets, highways, rural areas, inside parking structures, and/or parking lots) and/or environmental conditions (e.g., wet roads, snow covered roads, bright sunlight, rain, overcast conditions, darkness, and/or thunder storms). The one or more classified object labels, that can be used to classify or categorize the one or more objects, can include one or more vehicles, pedestrians, cyclists, buildings, utility structures, roads, highways, streets, parking areas, lane markers, traffic signage, traffic lights, curbsides, intersections, no-parking zones, and/or road shoulders.

The machine-learned model can be generated based at least in part on one or more classification processes or classification techniques. The one or more classification processes or classification techniques can include one or more computing processes performed by one or more computing devices based at least in part on sensor data associated with physical outputs from a sensor device. The one or more computing processes can include the classification (e.g., allocation or sorting into different groups or categories) of the physical outputs from the sensor device, based at least in part on one or more classification criteria (e.g., a size, shape, color, velocity, acceleration, and/or sound associated with an object). In some embodiments, the machine-learned model can include a convolutional neural network, a recurrent neural network, a recursive neural network, gradient boosting, a support vector machine, and/or a logistic regression classifier.

In some embodiments, generating the motion plan can include selecting (e.g., selecting based at least in part on the state data) one of a plurality of motion plans. The plurality of motion plans can include stopping the vehicle before a first threshold time period elapses (e.g., a threshold time period of half a second for emergency situations) or within a first threshold distance (e.g., a threshold distance equal to the minimum braking distance of the vehicle at the vehicle's current velocity) without changing a trajectory of the vehicle (e.g., stopping the vehicle without steering the vehicle); changing the trajectory of the vehicle (e.g., turning the vehicle in a different direction from the vehicle's current direction of travel) and stopping the vehicle before a second threshold time period elapses (e.g., bringing the vehicle to a stop in less than ten seconds when a tire is punctured) or a second threshold distance (e.g., stopping the vehicle at a road shoulder within thirty meters of the vehicle's current location); or changing the trajectory of the vehicle and stopping the vehicle after the second threshold time period (e.g., bringing the vehicle to a stop ten minutes after determining that the vehicle's fuel will be depleted within twenty minutes at the vehicle's current velocity) or after the second threshold distance (e.g., stopping the vehicle three kilometers after estimating that the vehicle's fuel will be depleted in six kilometers).

In some embodiments, the plurality of motion plans can include any number or amount of time thresholds or distance thresholds. Further, the plurality of motion plans can include one or more threshold time ranges (e.g., zero to ten seconds) or threshold distance ranges (e.g., twenty meters to fifty meters).

In some embodiments, generating the motion plan can be based at least in part on satisfying one or more vehicle stoppage conditions including one or more passengers of the vehicle requesting the vehicle to stop (e.g., a passenger verbally requesting the vehicle to stop or interacting with an interface device in the vehicle to request the vehicle to stop), an emergency vehicle (e.g., an ambulance) being within a threshold distance of the vehicle, a door of the vehicle opening when the vehicle is traveling, a failure or malfunction by one or more vehicle systems (e.g., engine malfunction) or vehicle components (e.g., the punctured tire) of the vehicle, and/or the vehicle receiving a request for remote operator assistance.

The systems, methods, and devices in the disclosed technology can provide a variety of technical effects and benefits. In particular, the disclosed technology can provide numerous benefits and improvements in a variety of areas including the areas of vehicle safety, traffic congestion reduction, overall vehicle operation, computational resource usage efficiency, and passenger comfort.

For example, the disclosed technology can improve the operational safety of a vehicle for passengers of the vehicle by more effectively determining when to stop the vehicle (e.g., the types of scenarios that will trigger vehicle stoppage), where to stop the vehicle (e.g., a safe location free from vehicle traffic in which to stop the vehicle), and how to stop the vehicle (e.g., a rate of decelerating the vehicle to a stop). As such, passengers of the vehicle can enjoy the benefits of greater safety when being transported in the vehicle by being stopped more safely in a more secure location. Further, the disclosed technology can improve the operational safety of other vehicles by more effectively preventing contact with other vehicles when the vehicle is stopping and further by stopping the vehicle in locations that are less likely to result in contact with another vehicle (e.g., stopping the vehicle outside of intersections).

Furthermore, the disclosed technology can provide the benefit of improving traffic flow for other vehicles. By more optimally determining a location to stop the vehicle and thereby minimizing obstruction of traffic, the disclosed technology can improve traffic flow by reducing the occurrence of a vehicle stopping in an intersection, high-way on-ramp, high-way off-ramp, or other location where a stopped vehicle can severely disrupt traffic flow. Additionally, by reducing traffic flow disruption, the disclosed technology can improve vehicle operation by reducing the wasteful consumption of energy that results from vehicles idling and traveling at sub-optimal velocity due to traffic disruptions caused by other vehicles stopping in sub-optimal locations.

Additionally, by leveraging a system that can use rules-based techniques and/or machine-learned models, the disclosed technology can better determine a safe and unobtrusive stopping location based on both environmental cues (e.g., the position of roads, road-shoulders, and other vehicles) and/or the state of the vehicle (e.g., an amount of fuel remaining and/or a vehicle door being opened in transit). For example, the disclosed technology can use dedicated computational resources (e.g., a custom designed processor) that can be used to stop the vehicle more efficiently and effectively than other more generalized approaches to stopping the vehicle.

The disclosed technology can also provide the benefits of greater comfort and security for passengers by generating a motion plan that stops a vehicle in a more convenient location. For example, passenger comfort and security can be increased by distinguishing between emergency situations (e.g., a passenger opening a vehicle door when the vehicle is travelling on a highway at one-hundred kilometers per hour) in which the vehicle should be stopped immediately and non-emergency situations (e.g., the vehicle's tire pressure is slightly low but still within safe operating limits and of sufficiently high pressure for the vehicle to travel to a service station) in which the vehicle does not need to be stopped immediately.

Accordingly, the disclosed technology can provide more effective determination of a motion plan to stop a vehicle including improvements in safety, vehicle operation, traffic congestion reduction, computational efficiency, and passenger comfort, all of which combine to improve the overall operation of the vehicle.

With reference now to FIGS. 1-13, example embodiments of the present disclosure will be discussed in further detail. FIG. 1 depicts a diagram of an example system 100 according to example embodiments of the present disclosure. As illustrated, FIG. 1 shows a system 100 that includes a communication network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. Further, the operations computing system 104 can include and/or otherwise be associated with the one or more computing devices that are remote from the vehicle 108. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of a vehicle including receiving state data from a vehicle (e.g., the vehicle 108) or one or more remote computing devices, determining whether the state data satisfies one or more vehicle stoppage criteria, generating a motion plan, and/or activating one or more vehicle systems.

For example, the operations computing system 104 can be configured to monitor and communicate with the vehicle 108 and/or its users to coordinate a vehicle service provided by the vehicle 108. To do so, the operations computing system 104 can manage a database that includes data including vehicle status data associated with the status of vehicles including the vehicle 108. The vehicle status data can include a location of a vehicle (e.g., a latitude and longitude of a vehicle), the availability of a vehicle (e.g., whether a vehicle is available to pick-up or drop-off passengers and/or cargo), or the state of objects external to a vehicle (e.g., the physical dimensions and/or appearance of objects external to the vehicle).

The operations computing system 104 can communicate with the one or more remote computing devices 106 and/or the vehicle 108 via one or more communications networks including the communications network 102. The communications network 102 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies).

For example, the communications network 102 can include a local area network (e.g. intranet), wide area network (e.g. Internet), wireless Local area network (LAN) network (e.g., via Wi-Fi), cellular network, a SATCOM network, Very high frequency (VHF) network, a high frequency (HF) network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 108 including exchanging (e.g., sending and/or receiving) data or signals with the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, acceleration, a trajectory, and/or a path of the vehicle 108 based in part on signals or data exchanged with the vehicle 108. In some implementations, the operations computing system 104 can include the one or more remote computing devices 106.

The vehicle 108 can be a ground-based vehicle (e.g., an automobile), an aircraft (e.g., an airplane and/or helicopter), a water craft (e.g., a boat), amphibious vehicle (e.g., hovercraft), and/or another type of vehicle. The vehicle 108 can be an autonomous vehicle that can perform various actions including driving, navigating, and/or operating, with minimal and/or no interaction from a human driver. The autonomous vehicle 108 can be configured to operate in one or more modes including, for example, a fully autonomous operational mode, a semi-autonomous operational mode, a park mode, and/or a sleep mode. A fully autonomous (e.g., self-driving) operational mode can be one in which the vehicle 108 can operate (e.g., drive and/or navigate the vehicle 108) with no interaction from a human driver including a human driver present in the vehicle 108 or a human driver remote (e.g., a tele-operator) from the vehicle 108. A semi-autonomous operational mode can be one in which the vehicle 108 can operate with some interaction from a human driver including a human driver present in the vehicle 108 or remote (e.g., a tele-operator) from the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle, the state of one or more passengers of the vehicle, and/or the state of an environment including one or more objects (e.g., the physical dimensions and/or appearance of the one or more objects) can be stored locally in one or more memory devices of the vehicle 108. Furthermore, the vehicle 108 can provide data indicative of the state of the one or more objects (e.g., physical dimensions and/or appearance of the one or more objects) within a predefined distance of the vehicle 108 to the operations computing system 104, which can store an indication, record, and/or other data indicative of the state of the one or more objects within a predefined distance of the vehicle 108 in one or more memory devices associated with the operations computing system 104 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices).

The one or more tangible, non-transitory, computer readable media can store instructions that when executed by the one or more processors cause the vehicle 108 (e.g., its computing system, one or more processors, and other devices in the vehicle 108) to perform operations and functions, including those described herein for determining user device location data and controlling the vehicle 108 with regards to the same. Further, the vehicle computing system 112 can exchange (e.g., send and/or receive) one or more signals and/or data with one or more vehicle systems, vehicle components, and/or remote computing devices. The one or more signals and/or data exchanged by the vehicle computing system 112 can be used to determine the state of the vehicle 108, the environment external to the vehicle 108, and the state of one or more passengers of the vehicle 108.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects that are proximate to the vehicle 108 (e.g., within range or a field of view of one or more of the one or more sensors 114). The one or more sensors 114 can include a LIDAR system, a Radio Detection and Ranging (RADAR) system, one or more cameras (e.g., visible spectrum cameras and/or infrared cameras), one or more thermal sensors, one or more motion sensors, one or more sound sensors (e.g., one or more microphones), one or more tactile sensors, one or more capacitive sensors, and/or other types of imaging capture devices and/or sensors. The sensor data 116 can include image data, radar data, LIDAR data, and/or other data acquired by the one or more sensors 114.

The one or more objects can include, for example, buildings, roads, road markings, road signs, traffic lights, foliage, pedestrians, vehicles, cyclists, and/or other objects. The one or more objects can be located on various parts of the vehicle 108 including a front side, rear side, left side, right side, top, or bottom of the vehicle 108. The sensor data 116 can be indicative of locations associated with the one or more objects within the surrounding environment of the vehicle 108 at one or more times. For example, sensor data 116 can be indicative of one or more LIDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data including the map data 122. The map data 122 can provide detailed information about the surrounding environment of the vehicle 108. For example, the map data 122 can provide information regarding: the identity and location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can include any device and/or circuitry for analyzing the position of the vehicle 108. For example, the positioning system 118 can determine position (e.g., the position of the vehicle 108) by using one or more inertial sensors, a satellite positioning system, based on IP/MAC address, by using triangulation and/or proximity to network access points or other network components (e.g., cellular towers and/or Wi-Fi access points), and/or other suitable techniques.

The position of the vehicle 108 can be used by various systems of the vehicle computing system 112 and/or provided to one or more remote computing devices (e.g., the operations computing system 104 and/or the remote computing device 106). For example, the map data 122 can provide the vehicle 108 with relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that interact and/or cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. By way of example, the mobility controller can translate a determined motion plan data 134 into instructions for controlling the vehicle 108 including adjusting the steering of the vehicle 108 "X" degrees ("X" representing a number of degrees) and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 106 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service).

The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat).

Figure 2:
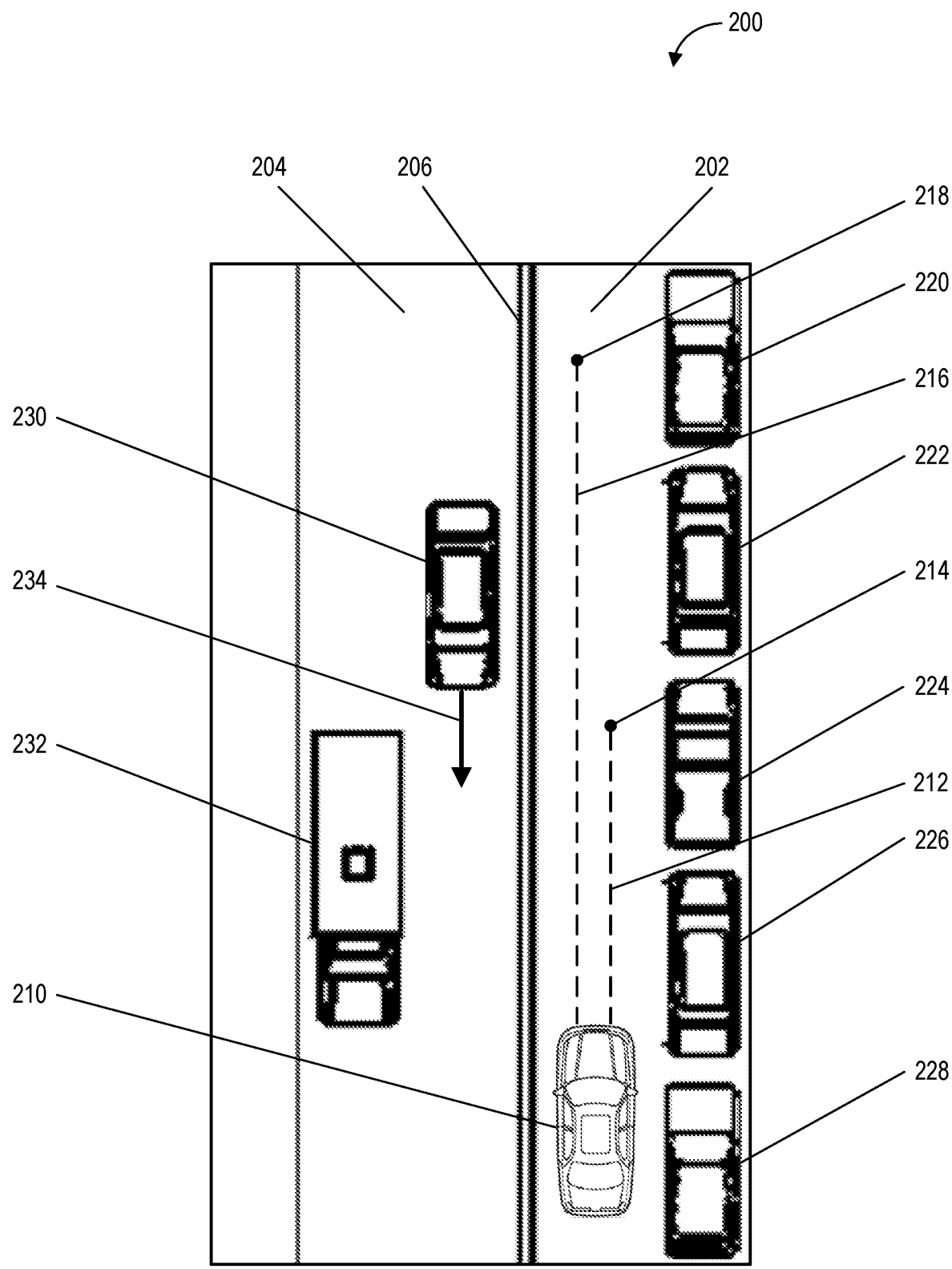
FIG. 2 depicts an example of an environment including an autonomous vehicle according to example embodiments of the present disclosure.

FIG. 2 depicts an example of an environment including an autonomous vehicle according to example embodiments of the present disclosure. One or more actions or events depicted in FIG. 2 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 2 shows an environment 200 that includes a road area 202, a road area 204 (e.g., a lane with a direction of traffic opposite the direction of traffic for the road area 202), a lane marker 206 (e.g., a lane marker between the road area 202 and the road area 204), a vehicle 210 (e.g., an autonomous vehicle), a path 212 (e.g., a travel path for the vehicle 210), a location 214 (e.g., a stopping location for the vehicle 210 at the end of the path 212), a path 216 (e.g., a second travel path for the vehicle 210), a location 218 (e.g., a second stopping location for the vehicle 210 at the end of the path 216), a vehicle 220, a vehicle 222, a vehicle 224, a vehicle 226, a vehicle 228, a vehicle 230 (a vehicle traveling in a direction opposite to the direction the vehicle 210 is traveling), a vehicle 232, and a path 234 (e.g., a travel path of the vehicle 230).

In this example, the vehicle 210 (e.g., an autonomous vehicle with some or all of the features of the vehicle 108) is traveling on the road area 202 (e.g., a city street) in the direction of the location 214 and the location 218. The direction of travel for the road area 202 and the vehicle 210 is opposite the direction of travel for the road area 204 which is separated from the road area 202 by the lane marker 206 (a painted lane marker on the surface of the road area 202 and the road area 204). On the road area 204, the vehicle 230 is traveling along the path 234 and is about to pass the vehicle 232 that is stationary (e.g., parked) on the road area 204.

In this example, a vehicle computing system of the vehicle 210 (e.g., the vehicle computing system 112) has detected an open door and determined that a vehicle stoppage condition has occurred. In response to the vehicle stoppage condition occurring, the vehicle computing system of the vehicle 210 selects and/or determines a severity level based on the vehicle stoppage occurrence.

For example, the vehicle computing system of the vehicle 210 can access severity level data associated with a plurality of severity levels and select and/or determine a severity level of the plurality of severity levels based at least in part on the vehicle stoppage condition that has occurred. In this example the vehicle computing system of the vehicle 210 selects a high severity level of the vehicle stoppage condition because the open door of the vehicle 210 could present a risk to passengers of the vehicle 210. Further, the conditions of the environment around the vehicle 210 constrain the stopping location of the vehicle 210 because the road area 204 is an opposite direction of traffic lane (e.g., stopping the vehicle 210 in the road area 204 will mean that the vehicle 210 can be in the path of one or more oncoming vehicles that are traveling along the road area 204), the vehicle 230 is traveling in the direction opposite to the vehicle 210 (e.g., stopping the vehicle 210 in the path 234 of the vehicle 230 could result in contact between the vehicle 210 and the vehicle 230), and the vehicle 210 is obstructed by the vehicle 220, 222, 224, 226, and 228, which prevents the vehicle 210 from parking on the side of the road area 202.

Based on the high severity level that was selected, the vehicle computing system of the vehicle 210 determines that the vehicle 210 will be brought to a stop without changing trajectory (e.g., turning). In a first scenario in which the vehicle 220, 222, 224, 226, and 228 remain stationary and do not indicate a turn (e.g., activate a signal light on the respective vehicle), the vehicle computing system of the vehicle 210 can determine that the vehicle 210 will follow the path 216 and stop at the location 218. In the first scenario, the vehicle computing system of the vehicle 210 generates a motion plan in which the vehicle 210 completes the stop within a short, but not jarringly short distance that is comfortable for passengers of the vehicle 210.

In a second scenario in which at least one of the vehicle 220, 222, 224, 226, or 228 either move or indicate a turn (e.g., activate a signal light on the respective vehicle), the vehicle computing system of the vehicle 210 can determine that the vehicle 210 will follow the path 212 and stop at the location 214. In the second scenario, the vehicle computing system of the vehicle 210 generates a motion plan in which the vehicle 210 completes the stop within the shortest distance the vehicle 210 is capable of (e.g., the shortest stopping distance that the braking systems of the vehicle 210 can bring the vehicle 210 to a stop).

Figure 3:
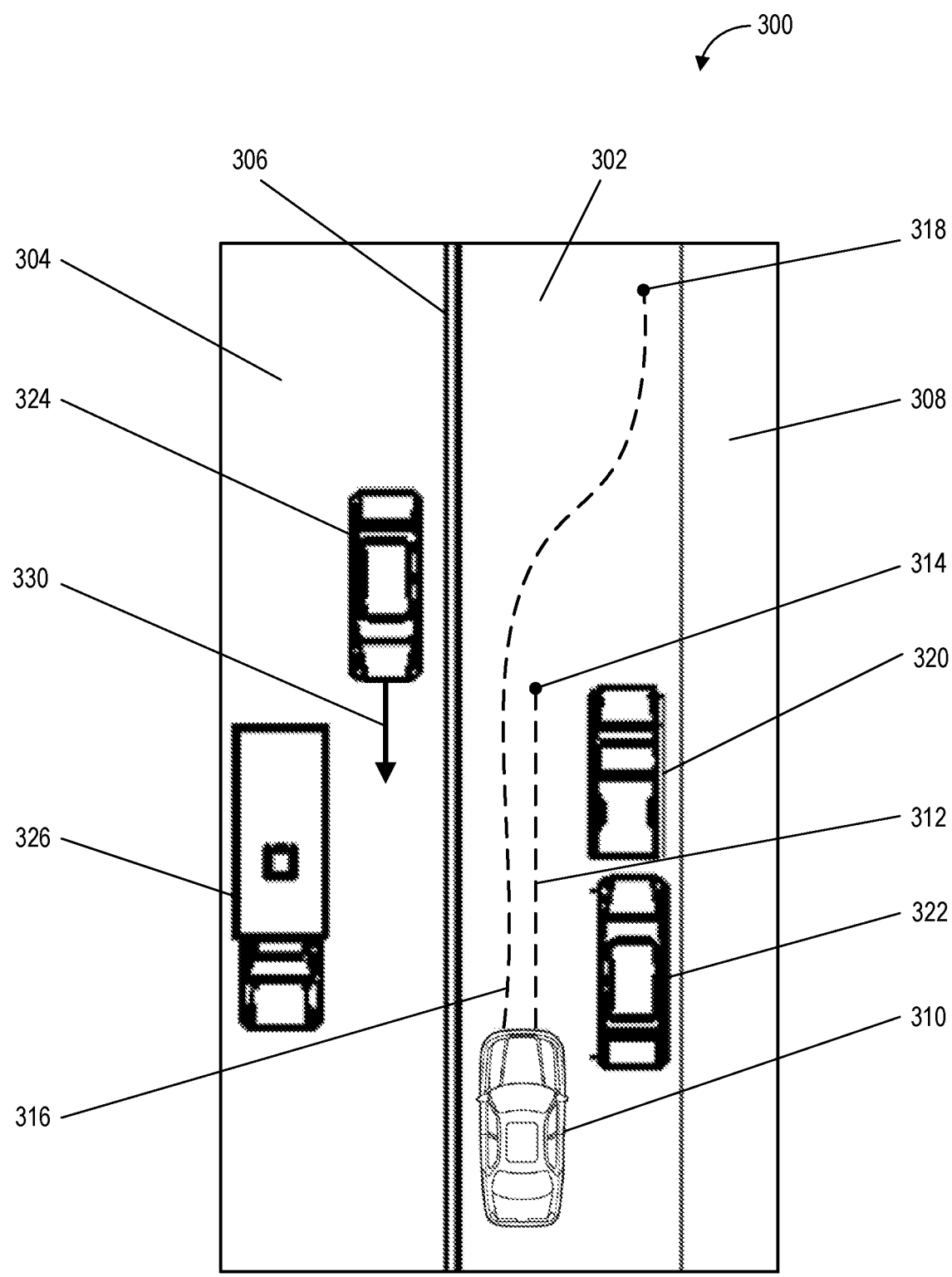
FIG. 3 depicts an example of an environment including an autonomous vehicle according to example embodiments of the present disclosure.

FIG. 3 depicts an example of an environment including an autonomous vehicle according to example embodiments of the present disclosure. One or more actions or events depicted in FIG. 3 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 3 shows an environment 300 that includes a road area 302, a road area 304 (e.g., a lane with a direction of traffic opposite to the direction of traffic for the road area 302), a lane marker 306 (e.g., a lane marker between the road area 302 and the road area 304), an area 308 (e.g., a sidewalk area), a vehicle 310 (e.g., an autonomous vehicle), a path 312 (e.g., a travel path for the vehicle 310), a location 314 (e.g., a stopping location for the vehicle 310 at the end of the path 312), a path 316 (e.g., a second travel path for the vehicle 310), a location 318 (e.g., a second stopping location for the vehicle 310 at the end of the path 316), a vehicle 320, a vehicle 322, a vehicle 324, a vehicle 326, and a path 330 (e.g., a travel path of the vehicle 324).

In this example, the vehicle 310 (e.g., an autonomous vehicle with some or all of the features of the vehicle 108) is traveling on the road area 302 (e.g., a suburban street) in the direction of the location 314. The direction of travel for the road area 302 and the vehicle 310 is opposite the direction of travel for the road area 304 which is separated from the road area 302 by the lane marker 306 (a painted lane marker on the surface of the road area 302 and the road area 304). On the road area 304, the vehicle 324 is traveling along the path 330 and is about to pass the vehicle 326 which is stationary (e.g., parked) on the road area 304.

Further, in this example, the vehicle computing system (e.g., the vehicle computing system 112) of the vehicle 310 (e.g., an autonomous vehicle that can include some or all of the features of the vehicle 108) has determined (e.g., determined based on detection by one or more sensors of the vehicle 310) a punctured tire and determined that a vehicle stoppage condition has occurred. In response to the vehicle stoppage condition occurring, the vehicle computing system of the vehicle 310 selects and/or determines a severity level based on the vehicle stoppage condition occurrence.

For example, the vehicle computing system of the vehicle 310 can access severity level data associated with a plurality of severity levels and select and/or determine a severity level of the plurality of severity levels based at least in part on the vehicle stoppage condition that has occurred. In this example the vehicle computing system of the vehicle 310 selects an intermediate severity level of the vehicle stoppage condition because the vehicle 310 cannot travel far with the punctured tire and the vehicle 310 has become unstable to operate (e.g., the ability of the vehicle 310 to turn has been diminished by the punctured tire of the vehicle 310) due to the punctured tire.

Furthermore, the conditions of the environment around the vehicle 310 constrain the stopping location of the vehicle 310 because the road area 304 is an opposite direction of traffic lane (e.g., stopping the vehicle 310 in the road area 304 will mean that the vehicle 310 can be in the path of one or more oncoming vehicles that are traveling along the road area 304) and the vehicle 324 is traveling in the direction opposite to the vehicle 310.

Based on the intermediate severity level that was selected, the vehicle computing system of the vehicle 310 determines that the vehicle 310 will be brought to a stop at the location 318 after changing trajectory (e.g., turning) so that the vehicle follows the path 316 before stopping at the location 318. In a first scenario in which the vehicle 320 and the vehicle 322 remain stationary and do not indicate a turn (e.g., activate a signal light on the respective vehicle), the vehicle computing system of the vehicle 310 generates a motion plan in which the vehicle 310 will follow the path 316 and stop at the location 318 alongside the area 308.

In a second scenario in which the vehicle 320 either moves forward in the direction of the location 318 or indicates a turn (e.g., activates a signal light on the vehicle 320), the vehicle computing system of the vehicle 310 can determine that the severity level has increased to a high severity level. Further, a different motion plan for the vehicle 310 can be generated so that the vehicle 310 will follow the path 312 and stop at the location 314. In the second scenario, the vehicle 310 completes the stop within the shortest distance the vehicle 310 is capable of (e.g., the shortest stopping distance that the braking systems of the vehicle 310 can bring the vehicle 310 to a stop).

Figure 4:
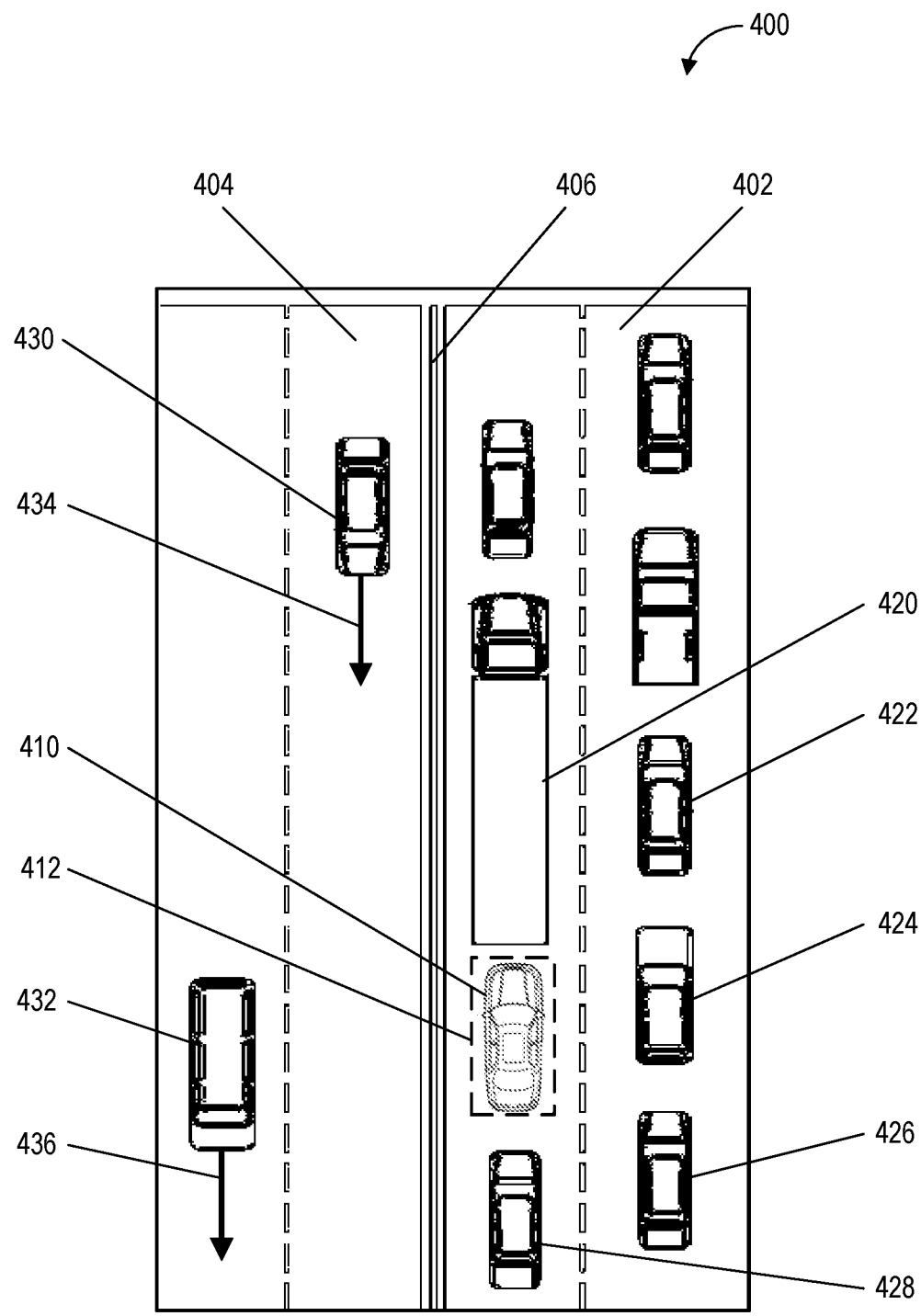
FIG. 4 depicts an example of an environment including an autonomous vehicle and multiple obstructive vehicles according to example embodiments of the present disclosure.

FIG. 4 depicts an example of an environment including an autonomous vehicle and multiple obstructive vehicles according to example embodiments of the present disclosure. One or more actions or events depicted in FIG. 4 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 4 shows an environment 400 that includes a road area 402, a road area 404 (e.g., a road lane with a direction of traffic opposite to the direction of traffic for the road area 402), a lane divider 406 (e.g., a barrier between the road area 402 and the road area 404), a vehicle 410 (e.g., an autonomous vehicle), an area 412 (e.g., an area in which the vehicle 410 has stopped), a vehicle 420 (e.g., a vehicle obstructing the vehicle 410), a vehicle 422 (e.g., a vehicle obstructing the vehicle 410), a vehicle 424 (e.g., a vehicle obstructing the vehicle 410), a vehicle 426 (e.g., a vehicle obstructing the vehicle 410), a vehicle 428 (e.g., a vehicle obstructing the vehicle 410), a vehicle 430 (e.g., a vehicle traveling in a lane with an opposite direction of travel to the lane in which the vehicle 410 is stopped), a vehicle 432 (e.g., a vehicle traveling in a lane with an opposite direction of travel to the lane in which the vehicle 410 is stopped), a path 434 (e.g., a travel path of the vehicle 430), and a path 436 (e.g., a travel path of the vehicle 432).

In this example, the vehicle 410 (e.g., an autonomous vehicle with some or all of the features of the vehicle 108) is stationary on the road area 402 (e.g., a highway). The direction of travel for the road area 402 and the vehicle 410 is opposite the direction of travel for the road area 404 which is separated from the road area 402 by the lane divider 406 (e.g., a barrier between the road area 402 and the road area 404). On the road area 404, the vehicle 430 is traveling along the path 434 in the same direction as the vehicle 432 which is traveling on the path 436 on the road area 404.

Furthermore, in this example, a vehicle computing system (e.g., the vehicle computing system 112) of the vehicle 410 (e.g., an autonomous vehicle that can include some or all of the features of the vehicle 108) has detected (e.g., detected after performing a diagnostic on the vehicle systems of the vehicle 410) an issue with an electrical system of the vehicle (e.g., an issue with an alternator of the vehicle 410 that can result in loss of power in the vehicle 410) and determined that a vehicle stoppage condition has occurred. In response to the vehicle stoppage condition occurring, the vehicle computing system of the vehicle 410 selects and/or determines a severity level based on the vehicle stoppage occurrence.

For example, the vehicle computing system of the vehicle 410 can access severity level data associated with a plurality of severity levels and select and/or determine a severity level of the plurality of severity levels based at least in part on the vehicle stoppage condition that has occurred. In this example the vehicle computing system of the vehicle 410 selects a high severity level of the vehicle stoppage condition because the vehicle 410 can suddenly lose electrical power which can adversely affect operation of the vehicle 410 in the highway environment of the road area 402.

Furthermore, the vehicle 410 is prevented from following a different motion plan because the vehicle 410 is obstructed from moving due to the vehicle 420 and the vehicle 422 ahead of the vehicle 410, the vehicle 424 and the vehicle 426 to the right side of the vehicle 410, the vehicle 428 to the rear of the vehicle, the lane divider 406 blocking the vehicle on the left side of the vehicle, and the vehicle 430 and the vehicle 432 that are traveling in the opposite direction of travel on the road area 404. Based on the high severity level that was selected, the vehicle computing system of the vehicle 410 can request assistance (e.g., request remote assistance via a wireless communication channel) and determine that the vehicle 410 will remain stationary until assistance for the vehicle 410 arrives. Accordingly, the motion plan generated by the vehicle computing system of the vehicle 410 includes the vehicle 410 remaining in place.

Figure 5:
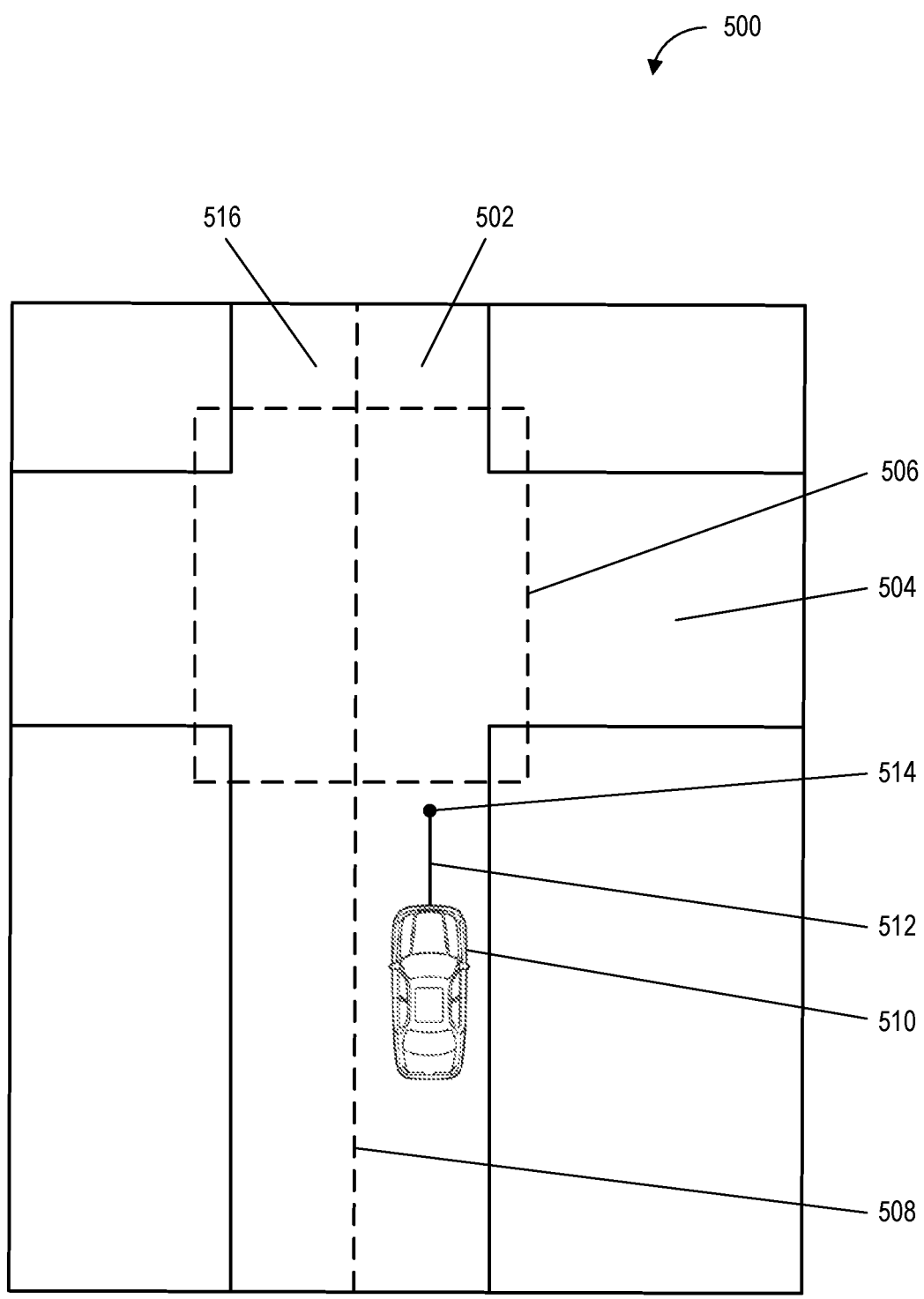
FIG. 5 depicts an example of an environment including an autonomous vehicle approaching an intersection according to example embodiments of the present disclosure.

FIG. 5 depicts an example of an environment including an autonomous vehicle approaching an intersection according to example embodiments of the present disclosure. One or more actions or events depicted in FIG. 5 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 5 shows an environment 500 that includes a road area 502, a road area 504 (e.g., a lane with a direction of traffic perpendicular to the direction of traffic for the road area 502), an intersection area 506 (e.g., an intersection of the road area 502 and the road area 504), a lane marker 508 (e.g., a lane marker to indicate a division between different lanes of the road area 502), a vehicle 510 (e.g., an autonomous vehicle), a path 512 (e.g., a travel path of the vehicle 510), a location 514 (e.g., a stopping location for the vehicle 510 at the end of the path 512); and a road area 516.

In this example, the vehicle 510 (e.g., an autonomous vehicle with some or all of the features of the vehicle 108) is traveling on the road area 502 (e.g., a city street) in the direction of the intersection 506 which is an intersection of the road area 502 and the road area 504 (e.g., a city street perpendicular to the vehicle 510). The road area 502 includes a lane marker 508 (e.g., a painted lane marker) that separates the road area 502 from the road area 516.

Furthermore, in this example a vehicle computing system (e.g., the vehicle computing system 112) of the vehicle 510 has detected an issue with the engine (e.g., an impending engine failure) of the vehicle 510 and determined that a vehicle stoppage condition has occurred. In response to the vehicle stoppage condition occurring, the vehicle 510 selects and/or determines a severity level based on the type of vehicle stoppage occurrence.

For example, the vehicle computing system of the vehicle 510 can access severity level data associated with a plurality of severity levels and select and/or determine a severity level of the plurality of severity levels based at least in part on the vehicle stoppage condition that has occurred. In this example the vehicle 510 selects a high severity level of the vehicle stoppage condition because the vehicle 510 will soon stop due to the issue with the engine of the vehicle 510.

Based on the high severity level that was selected, the vehicle computing system of the vehicle 510 determines that the vehicle 510 will be brought to a stop at the location 514 without changing trajectory (e.g., turning) so that the vehicle follows the path 512 before stopping at the location 514. In this example, the vehicle computing system of the vehicle 510 detects the intersection 506 and determines that the vehicle 510 will stop before entering the intersection 506. Accordingly, the vehicle computing system of the vehicle 510 generates a motion plan in which the vehicle 510 stops at the location 514, thereby avoiding stopping in the intersection 506 and potentially disrupting traffic by blocking the intersection 506. As a result, one or more passengers of the vehicle 510 can benefit from improved safety and one or more other vehicles can benefit from the avoidance of contributing to traffic congestion by the vehicle 510.

Figure 6:
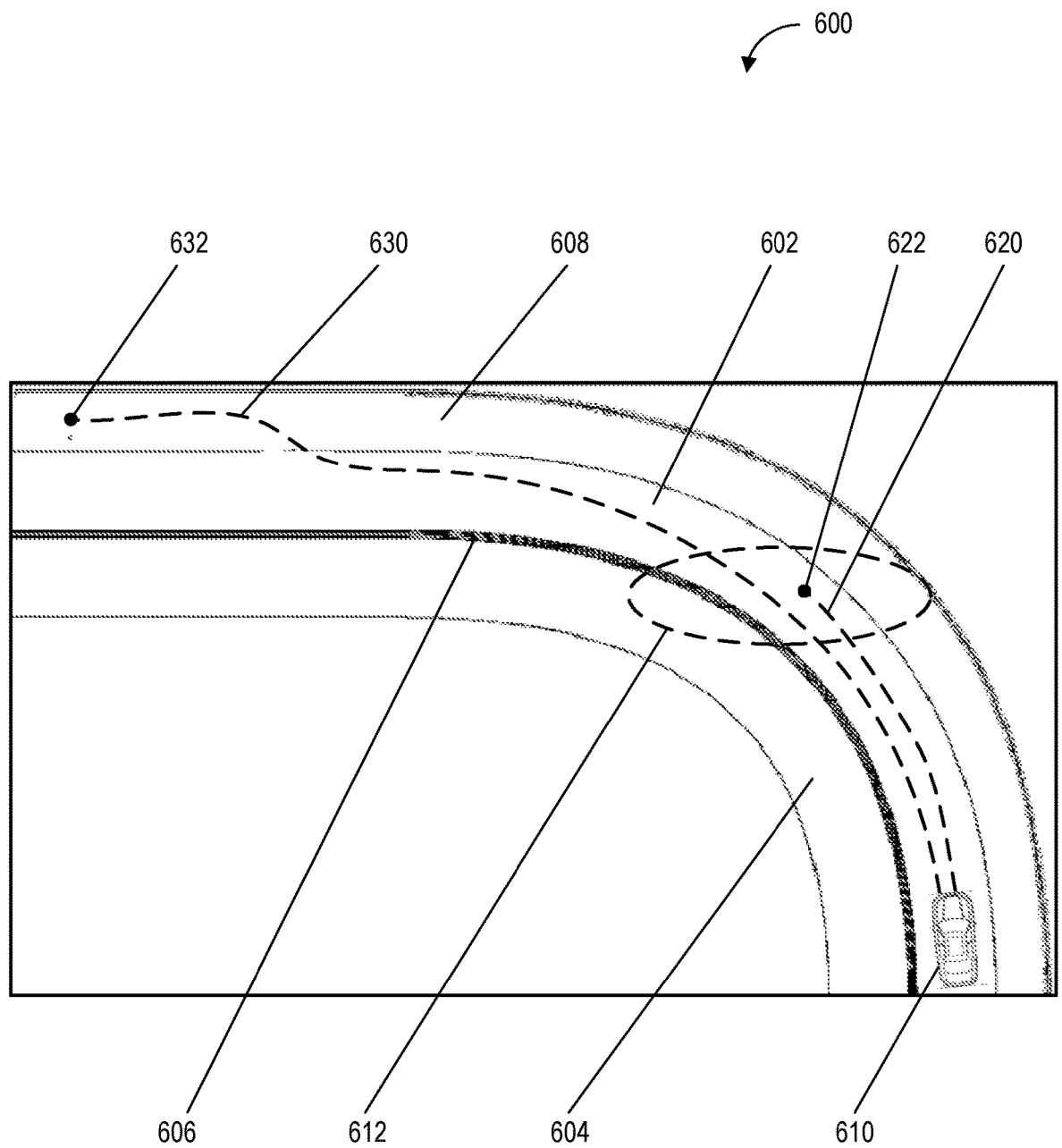
FIG. 6 depicts an example of an environment including an autonomous vehicle approaching an elevated area according to example embodiments of the present disclosure.

FIG. 6 depicts an example of an environment including an autonomous vehicle approaching an elevated area according to example embodiments of the present disclosure. One or more actions or events depicted in FIG. 6 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 6 shows an environment 600 that includes a road area 602, a road area 604 (e.g., a lane with a direction of traffic opposite to the direction of traffic for the road area 602), a lane marker 606 (e.g., a lane marker between the road area 602 and the road area 604), an area 608 (e.g., a road shoulder adjacent to the road area 602), a vehicle 610 (e.g., an autonomous vehicle), an area 612 (e.g., the crest of a hill), a path 620 (e.g., a travel path for the vehicle 610), a location 622 (e.g., a stopping location for the vehicle 610 at the end of the path 620), a path 630 (e.g., a second travel path for the vehicle 610), and a location 632 (e.g., a second stopping location for the vehicle 610 at the end of the path 630).

In this example, the vehicle 610 (e.g., an autonomous vehicle with some or all of the features of the vehicle 108) is traveling uphill on the road area 602 (e.g., a road in a rural area) in the direction of the area 612 (e.g., the crest of a hill including the road area 602 and the road area 604). The direction of travel for the road area 602 and the vehicle 610 is opposite the direction of travel for the road area 604 which is separated from the road area 602 by the lane marker 606 (a painted lane marker on the surface of the road area 602 and the road area 604).

In this example, the vehicle 610 (e.g., an autonomous vehicle that can include some or all of the features of the vehicle 108) is traveling in dark conditions at night, and a vehicle computing system (e.g., the vehicle computing system 112) of the vehicle 610 has detected an issue (e.g., the headlights of the vehicle are covered in mud) with the headlights of the vehicle 610, and determined that a vehicle stoppage condition has occurred. In response to the vehicle stoppage condition occurring, the vehicle 610 selects and/or determines a severity level based on the vehicle stoppage occurrence.

For example, the vehicle computing system of the vehicle 610 can access severity level data associated with a plurality of severity levels and select and/or determine a severity level of the plurality of severity levels based at least in part on the vehicle stoppage condition that has occurred. In this example the vehicle 610 selects an intermediate severity level of the vehicle stoppage condition because the vehicle 610 is able to safely pull over to the area 608 (e.g., a road shoulder).

Based on the intermediate severity level that was selected, the vehicle computing system of the vehicle 610 determines that the vehicle 610 will be brought to a stop at the location 632 after changing trajectory (e.g., turning) so that the vehicle follows the path 630 before stopping at the location 632 that is located in the area 608. In this example, the vehicle computing system of the vehicle 610 generates a motion plan that includes stopping the vehicle 610 at the location 632. As such, the vehicle 610 avoids obstructing other vehicles traveling along the road area 602 and also avoids stopping the vehicle 610 at the location 612 which is the crest of a hill. Furthermore, the vehicle computing system of the vehicle 610 avoids stopping the vehicle 610 in the road area 604 because stopping the vehicle 610 in the road area 604 will mean that the vehicle 610 can be in the path of one or more oncoming vehicles that are traveling along the road area 604. Because objects (e.g., the vehicle 610) in the area 612 may not be visible from lower elevations, avoiding the generation of a motion plan that includes stopping the vehicle 610 in the area 612 improves safety for one or more passengers of the vehicle 610 and for one or more passengers of vehicles approaching the vehicle 610. In contrast, if the vehicle followed the path 620 and stopped at the location 622 or any other location within the area 612, the vehicle 610 could be in the path of other vehicles.

Figure 7:
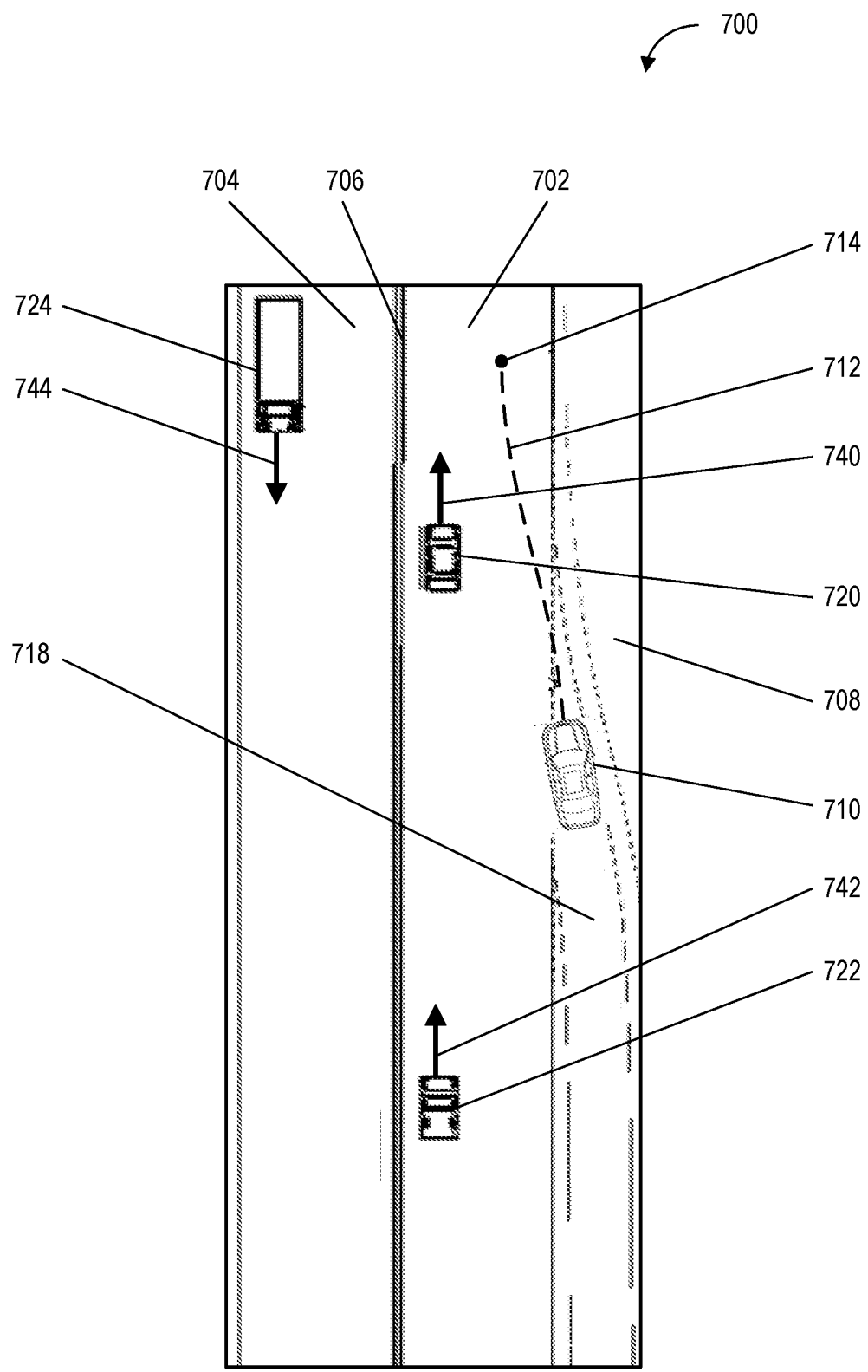
FIG. 7 depicts an example of an environment including an autonomous vehicle on a merging lane according to example embodiments of the present disclosure.

FIG. 7 depicts an example of an environment including an autonomous vehicle on a merging lane according to example embodiments of the present disclosure. One or more actions or events depicted in FIG. 7 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 7 shows an environment 700 that includes a road area 702, a road area 704 (e.g., a lane with a direction of traffic opposite to the direction of traffic for the road area 702), a lane divider 706 (e.g., a barrier between the road area 802 and the road area 804), an area 708 (e.g., a road shoulder adjacent to the road area 702 and a road area 718), a vehicle 710 (e.g., an autonomous vehicle), a path 712 (e.g., a travel path of the vehicle 710), a location 714 (e.g., a stopping location of the vehicle 710 at the end of the path 712), the road area 718 (e.g., a highway on-ramp), a vehicle 720, a vehicle 722, a vehicle 724, a path 740 (e.g., a travel path of the vehicle 720), a path 742 (e.g., a travel path of the vehicle 722), and a path 744 (e.g., a travel path of the vehicle 724).

In this example, the vehicle 710 (e.g., an autonomous vehicle with some or all of the features of the vehicle 108) is traveling on the road area 718 (e.g., a highway on-ramp) in the direction of the road area 702 (e.g., a highway). The direction of travel for the road area 702 is opposite the direction of travel for the road area 704 which is separated from the road area 702 by the lane divider 706 (e.g., a concrete barrier separating the road area 702 and the road area 704). On the road area 704, the vehicle 724 is traveling along the path 730 and is about to pass the vehicle 726 that is stationary (e.g., parked) on the road area 704.

In this example, just as the vehicle 710 is entering onto the road area 702 from the road area 718, a vehicle computing system (e.g., the vehicle computing system 112) of the vehicle 710 (e.g., an autonomous vehicle that can include some or all of the features of the vehicle 108) detects a malfunction in one of the primary sensors of the vehicle (e.g., a LIDAR device has been damaged or blocked). As a result of the malfunction in the primary sensor, a vehicle computing system (e.g., the vehicle computing system 112) of the vehicle 710 determines that a vehicle stoppage condition has occurred. In response to determining that the vehicle stoppage condition has occurred, the vehicle computing system of the vehicle 710 selects and/or determines a severity level based on the vehicle stoppage occurrence. For example, the vehicle computing system of the vehicle 710 can access severity level data associated with a plurality of severity levels and select and/or determine a severity level of the plurality of severity levels based at least in part on the vehicle stoppage condition that has occurred.

In this example the vehicle computing system of the vehicle 710 selects a high severity level of the vehicle stoppage condition because the operational performance and capability of the vehicle 710 is greatly reduced due to the malfunctioning LIDAR device. Further, the conditions of the environment around the vehicle 710 constrain the stopping location of the vehicle 710 because the road area 704 is an opposite direction of traffic lane and blocked by the lane divider 706, the vehicle 720 and the vehicle 722 can intersect with the path of the vehicle 710 if the vehicle 710 does not stop quickly (e.g., within a predetermined time range), and the vehicle 724 is traveling along the path 744 which is opposite the direction of travel of the vehicle 710.

Based on the high severity level that was selected, the vehicle computing system of the vehicle 710 can generate a motion plan in which the vehicle 710 will be brought to a stop at the location 714 without changing trajectory (e.g., turning) after decelerating along the path 712.

Figure 8:
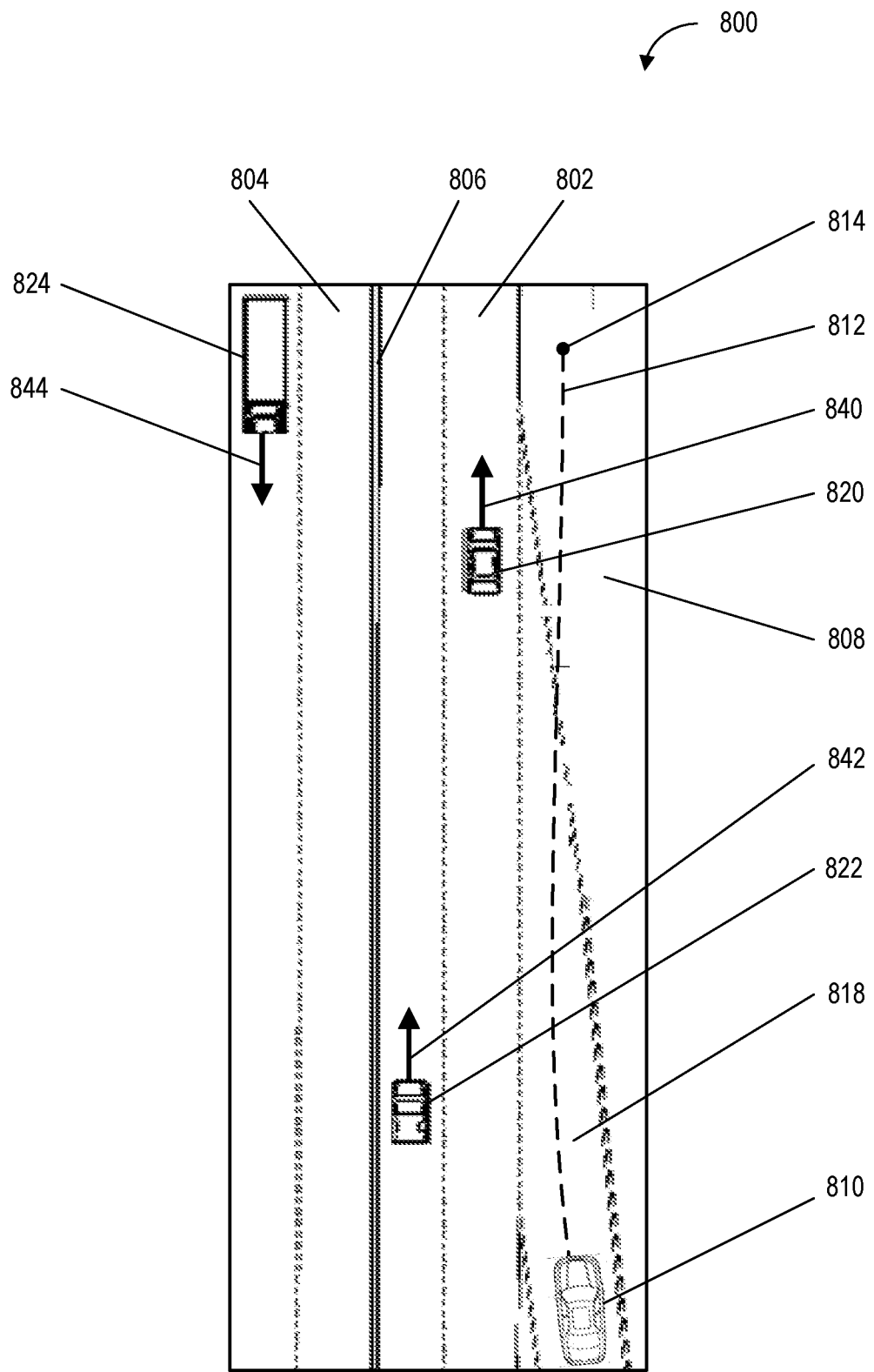
FIG. 8 depicts an example of an environment including an autonomous vehicle on a merging lane according to example embodiments of the present disclosure.

FIG. 8 depicts an example of an environment including an autonomous vehicle on a merging lane according to example embodiments of the present disclosure. One or more actions or events depicted in FIG. 8 can be implemented by one or more devices (e.g., one or more computing devices) or systems (e.g., one or more computing systems) including, for example, the operations computing system 104, the vehicle 108, or the vehicle computing system 112, shown in FIG. 1.

As illustrated, FIG. 8 shows an environment 800 that includes a road area 802, a road area 804 (e.g., a lane with a direction of traffic opposite to the direction of traffic for the road area 802), a lane divider 806 (e.g., a barrier between the road area 802 and the road area 804), an area 808 (e.g., a road shoulder adjacent to the road area 802 and a road area 818), a vehicle 810 (e.g., an autonomous vehicle), a path 812 (e.g., a travel path of the vehicle 810), a location 814 (e.g., a stopping location of the vehicle 810 at the end of the path 812), the road area 818 (e.g., a highway on-ramp), a vehicle 820, a vehicle 822, a vehicle 824, a path 840 (e.g., a travel path of the vehicle 820), a path 842 (e.g., a travel path of the vehicle 822), and a path 844 (e.g., a travel path of the vehicle 824).

In this example, just as the vehicle 810 (e.g., an autonomous vehicle with some or all of the features of the vehicle 108) is entering onto the road area 802 from the road area 818, a vehicle computing system of the vehicle 810 (e.g., an autonomous vehicle that can include some or all of the features of the vehicle 108) detects a foreign object (e.g., a tree branch) lodged in the front wheel well of the vehicle 810 and determines that a vehicle stoppage condition has occurred. In response to determining that the vehicle stoppage condition has occurred, a vehicle computing system (e.g., the vehicle computing system 112) of the vehicle computing system of the vehicle 810 selects and/or determines a severity level based on the vehicle stoppage occurrence.

For example, the vehicle computing system of the vehicle 810 can access severity level data associated with a plurality of severity levels and select and/or determine a severity level of the plurality of severity levels based at least in part on the vehicle stoppage condition that has occurred. In this example the vehicle computing system of the vehicle 810 selects an intermediate severity level of the vehicle stoppage condition because the foreign object diminishes the performance of the vehicle 810 but does not make the vehicle 810 inoperable or dangerous to operate.

Further, the conditions of the environment around the vehicle 810 constrain the stopping location of the vehicle 810 because the road area 804 is an opposite direction of traffic lane and blocked by the lane divider 806, the vehicle 820 and the vehicle 822 can intersect with the path of the vehicle 810 if the vehicle 810 does not stop quickly (e.g., within a predetermined time range), and the vehicle 824 is traveling along the path 844 which is opposite the direction of travel of the vehicle 810. Based on the intermediate severity level that was selected, the vehicle computing system of the vehicle 810 can generate a motion plan in which the vehicle 810 will stop at the location 814 after changing trajectory (e.g., turning to stop at the road area 808 instead of continuing onto the road area 802) and decelerating along the path 812.

Figure 9:
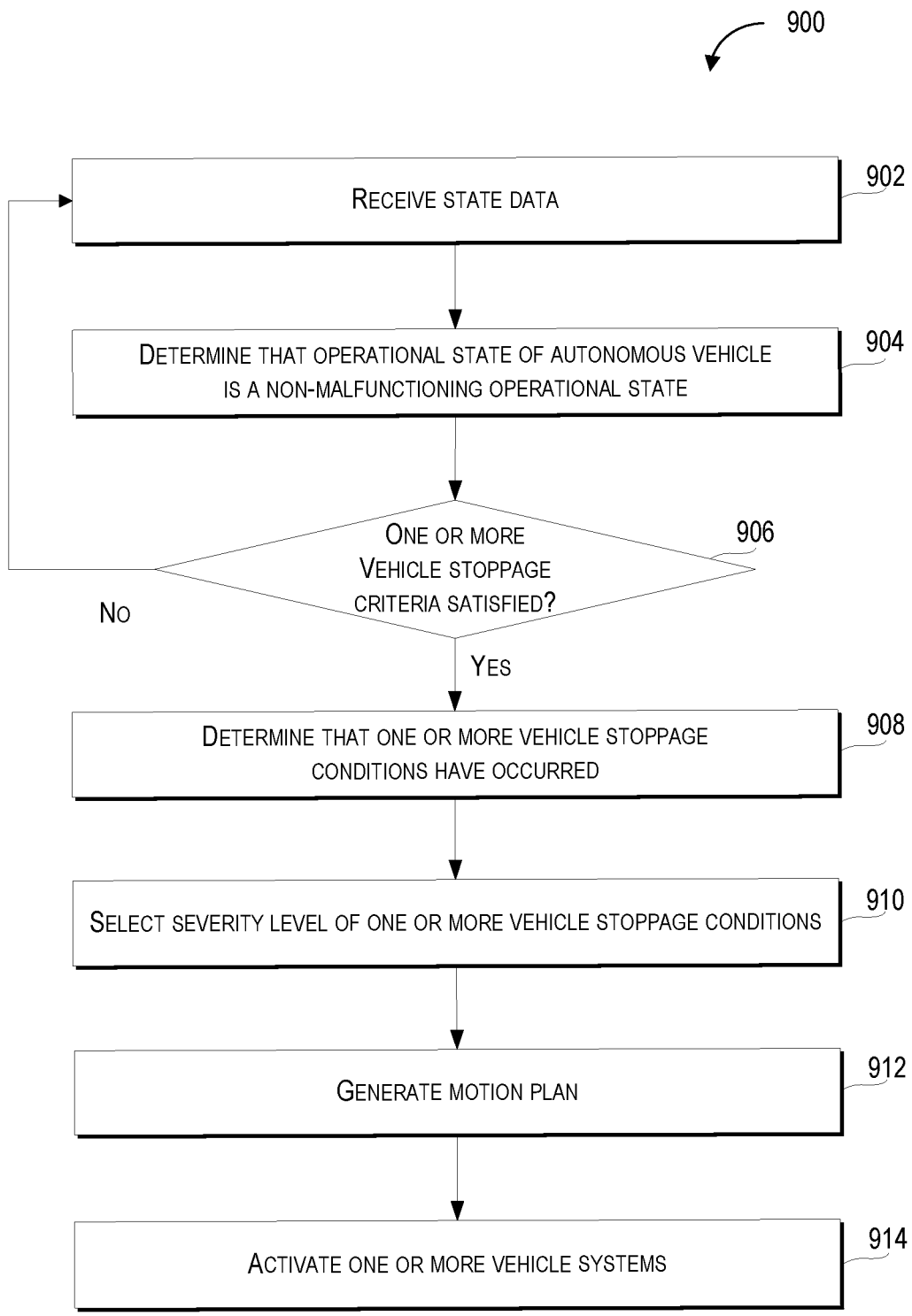
FIG. 9 depicts a flow diagram of an example method of autonomous vehicle operation according to example embodiments of the present disclosure.

FIG. 9 depicts a flow diagram of an example method of autonomous vehicle operation according to example embodiments of the present disclosure. One or more portions of a method 900 can be implemented by one or more devices (e.g., one or more computing devices) or systems including, for example, the operations computing system 104, the vehicle 108, or the vehicle computing system 112, shown in FIG. 1. Moreover, one or more portions of the method 900 can be implemented as an algorithm on the hardware components of the devices described herein (e.g., as in FIG. 1) to, for example, generate a motion plan for a vehicle based on the determination that one or more vehicle stoppage conditions have occurred. FIG. 9 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 902, the method 900 can include receiving one or more signals and/or data including state data. The state data can include information associated with one or more states of a vehicle (e.g., the vehicle 108) and/or one or more states of an environment external to the vehicle. For example, the state data can be received by one or more components (e.g., interconnects, transmitters, and/or receivers) of the vehicle 108 that are configured to send and/or receive one or more signals (e.g., signals transmitted wirelessly and/or via wire) that include the state data.

The state data can be based at least in part on one or more states of a vehicle (e.g., physical states based on the vehicle's location, vehicle's motion, and/or states of the vehicle's associated vehicle systems including engine, braking, and/or steering systems) and one or more states of the environment (e.g., the environment can include one or more objects including other vehicles, pedestrians, buildings, and/or natural features) external to the vehicle. The state data can be based at least in part on one or more sensor outputs from one or more sensors (e.g., one or more cameras, one or more LIDAR devices, one or more sonar devices, one or more radar devices, one or more tactile devices, and/or microphones) that can detect the state of the vehicle and/or the state of the environment.

For example, the state data can include a velocity of the vehicle (e.g., a velocity of the vehicle in meters per second), an acceleration of the vehicle; a trajectory of the vehicle (e.g., a trajectory of the vehicle with respect to a geographical location or an object in the environment); a current geographic location of the vehicle (e.g., a latitude and longitude of the vehicle); an incline angle of the vehicle relative to the ground; a vehicle door state (e.g., whether a door is open or closed and/or the extent to which a door is open); a vehicle window state (e.g., whether a window is open or closed and/or the extent to which a window is open); a vehicle engine or vehicle motor state (e.g., data associated with whether the engine or motor is operating normally and/or one or more characteristics of the vehicle motor or vehicle engine including the temperature of the vehicle engine or vehicle motor); an autonomy system (e.g., data associated with the state of the autonomy system including whether the autonomy system is operating normally); and or a vehicle tire state (e.g., tire pressure). Further, the state data can include one or more states of the environment external to the vehicle including one or more spatial relations including the location and/or position of one or more objects, the physical dimensions of one or more objects, and an identity of one or more objects (e.g., whether an object is a building, a vehicle, a road surface, a road marking, a road sign, or a pedestrian).

In some embodiments, one or more portions of the state data can be received from one or more remote sources including one or more remote computing devices. For example, the vehicle 108 can receive map data from one or more remote computing devices. The map data can include a map including the area the vehicle and can be used to determine one or more locations that the vehicle can traverse and/or stop at. The one or more locations included in the map data can include one or more parking structures, one or more parking lots, one or more fuel stations, one or more hospitals, and/or one or more rest stops. Further, the map data can include data associated with one or more roads including directions of traffic for roads, areas with traffic congestion, and/or street light states for intersections.

In some embodiments, the state data can include diagnostic data associated with an internal vehicle diagnostic of one or more vehicle systems of the autonomous vehicle. For example, the diagnostic data can include data about the operational state of one or more vehicle systems of the vehicle including information about whether each of the one or more vehicle systems is on-line and functioning normally (e.g., not malfunctioning or operating outside of a predetermined normal operating range).

At 904, the method 900 can include determining, based at least in part on the state data, an operational state of an autonomy system of the vehicle. For example, the vehicle computing system 112 can run or execute one or more diagnostics to determine the state of the vehicle's autonomy system and based on the results of the diagnostic, determine whether the vehicle's autonomy system is operating normally (e.g., without errors, defects, and/or malfunctions).

The one or more diagnostics can include one or more tests to determine whether the vehicle's autonomy system is exchanging (e.g., sending and/or receiving) one or more signals or data, whether the one or more signals or data are within a normal operational range, and/or whether power is being supplied to the vehicle's autonomy system. Furthermore, the vehicle computing system can determine the state of the vehicle's autonomy system based at least in part on the diagnostic data (e.g., the diagnostic data of 902) associated with the autonomy system. In some embodiments, satisfying the one or more vehicle stoppage criteria can include determining that the operational state of the autonomy system is a non-malfunctioning operational state.

At 906, the method 900 can include determining whether, when, or that, the state data satisfies one or more vehicle stoppage criteria. For example, the vehicle computing system 112 can determine whether, when, or that, the state data satisfies one or more vehicle stoppage criteria based on a comparison of one or more portions of the state data to the one or more vehicle stoppage criteria. Satisfying the one or more vehicle stoppage criteria can include the vehicle computing system comparing the state data (e.g., one or more attributes, parameters, and/or values of the state data) to the one or more vehicle stoppage criteria which can include one or more corresponding attributes, parameters, and/or values.

For example, the state data can include data associated with one or more vehicle systems and/or vehicle components of the vehicle including mechanical systems, electrical systems, mechanical components, and/or electrical components. The data associated with the state of the one or more vehicle systems or vehicle components can be compared to one or more vehicle stoppage criteria including one or more normal operational states (e.g., a normal pressure for a tire, a normal temperature for an engine, and/or a door being closed when the vehicle is in transit) that can be used to determine if the vehicle systems are operating within a range of normal operation (e.g., the vehicle systems are not operating in a way that is defective or malfunctioning) and whether the vehicle should come to a stop. Accordingly, satisfying the one or more vehicle stoppage criteria can include the state of the vehicle systems being within one or more ranges of normal operation.

Further, the state data can include data associated with the state of the environment including one or more states of one or more objects. The one or more objects in the environment can include the state of other vehicles, cyclists, pedestrians, buildings, foliage, roads, lane markings, traffic signs, and/or traffic signals. The data associated with the state of the environment can be compared to one or more vehicle stoppage criteria including one or more states of the environment (e.g., a distance between the vehicle and one or more objects including other vehicles and lane markings) that can be used to determine if the relationship between the vehicle and the environment is within a normal range (e.g., the vehicle is not too close to one or more objects) and if vehicle should come to a stop. Accordingly, satisfying the one or more vehicle stoppage criteria can include the state of the environment being within a normal range.

The one or more vehicle stoppage criteria can include one or more passengers of the vehicle requesting the vehicle to stop, an emergency vehicle (e.g., a fire truck) being within a threshold distance of the vehicle, a door of the vehicle opening when the vehicle is traveling, a failure or malfunction by one or more vehicle systems (e.g., electrical system malfunction) or vehicle components (e.g., broken windshield) of the vehicle, and/or the vehicle receiving a request for remote operator assistance (e.g., a tele-operator at a remote location). For example, when the one or more vehicle stoppage conditions include one or more passengers of the vehicle requesting the vehicle to stop (e.g., a passenger verbally requesting the vehicle to stop and/or interacting with an interface device in the vehicle to request the vehicle to stop), the vehicle computing system 112 can receive outputs from one or more microphones and/or text input devices that detect requests by the one or more passengers of the vehicle.

Responsive to the state data satisfying the one or more vehicle stoppage criteria, the method 900 can proceed to 908. Responsive to the state data not satisfying the one or more vehicle stoppage criteria, the method 900 can end or return to 902 or 904.

At 908, the method 900 can include determining, responsive to the state data satisfying the one or more vehicle stoppage criteria, that one or more vehicle stoppage conditions have occurred in the vehicle and/or the environment external to the vehicle. For example, based in part on changes in a data structure associated with the state data (e.g., a portion of the data structure (e.g., a flag) that can be set to indicate that the satisfaction of the one or more vehicle stoppage conditions has occurred when one or more signals or data associated with the satisfaction of the one or more vehicle stoppage conditions is received), the vehicle computing system 112 can determine that one or more vehicle stoppage conditions have occurred in the vehicle and/or the environment external to the vehicle, which can cause the vehicle computing system 112 to activate one or more systems (e.g., computing systems associated with generating data) to initiate the generation of data associated with determining and/or selecting a severity level associated with the one or more vehicle stoppage conditions.

At 910, the method 900 can include selecting, based at least in part on the state data, a severity level of the one or more vehicle stoppage conditions from a plurality of severity levels (e.g., available severity levels). For example, the vehicle computing system 112 can access data including the state data, and select a portion of the state data that is associated with a plurality of severity levels.

In some embodiments, each available severity level of the plurality of available severity levels can be associated with a different set of respective constraints. The different set of respective constraints associated with the plurality of available severity levels can include a time constraint (e.g., the vehicle will stop within the duration of the time constraint), a velocity constraint (e.g., a maximum velocity of the vehicle as the vehicle before the vehicle stops), a deceleration constraint (e.g., a maximum deceleration of the vehicle as the vehicle stops), a trajectory change constraint (e.g., whether the vehicle changes trajectory before stopping), and/or a location constraint (e.g., locations the vehicle will not traverse and/or locations that are not included in a travel path of the vehicle).

In some embodiments, the severity level of the one or more vehicle stoppage conditions can be determined, based at least in part on the state data. For example, the vehicle computing system 112 can use one or more states of the vehicle or the environment external to the vehicle to determine the severity level of the one or more vehicle stoppage conditions. For example, the severity can be based at least in part on the proximity of one or more objects in the environment to the vehicle (e.g., the vehicle being within a proximity distance of an ambulance) and/or one or more sound states in the environment external to the vehicle (e.g., the sound of an fire truck siren) to determine that severity level of the one or more stoppage conditions.

In some embodiments, the severity level can correspond at least in part to an aggregate duration of the one or more time intervals of the motion plan that will be generated. The vehicle computing system 112 can determine the total duration of one or more time intervals that the vehicle will pass before the vehicle stops based on the severity level. For example, the vehicle computing system 112 can determine that the aggregate duration of the one or more time intervals of the motion plan that will be generated is one second or less when the severity level is high, greater than one second and less than ten seconds when the severity level is intermediate, and ten seconds or more when the severity level is low.

In some embodiments, the severity level of the one or more vehicle stoppage conditions can be inversely proportional to the aggregate duration of the one or more time intervals of the motion plan. For example, as the severity level increases the aggregate duration of the one or more time intervals decreases and as the severity level decreases the aggregate duration of the one or more time intervals increases. Further, the relation between the severity level and the aggregate duration of the one or more time intervals can be linear or non-linear.

In some embodiments, the severity level of the one or more vehicle stoppage conditions can be inversely proportional to one or more motion planning characteristics (e.g., as the severity level increases the values associated with the one or more motion planning characteristics decrease, or as the severity level decreases the values associated with the one or more motion planning characteristics increase) that include the one or more motion characteristics (e.g., the velocity of the vehicle, acceleration of the vehicle, and/or trajectory of the vehicle). The one or more motion planning characteristics can include a distance between the current location of the vehicle and the destination location, an amount of change in the velocity of the autonomous vehicle over the one or more time intervals, an amount of change in the acceleration of the autonomous vehicle over the one or more time intervals, and/or an amount of change in the trajectory of the autonomous vehicle over the one or more time intervals.

Furthermore, the one or more of the motion planning characteristics can be weighted so that certain motion planning characteristics contribute more to the severity level of the one or more vehicle stoppage conditions than other motion planning characteristics (e.g., distance between the current location of the vehicle and the destination location may be more heavily weighted than the amount of change in acceleration of the vehicle).

In some embodiments, selecting or determining the severity level of the one or more vehicle stoppage conditions can include running or executing an internal vehicle diagnostic (e.g., a diagnostic of one or more vehicle systems in the vehicle). The internal vehicle diagnostic can determine one or more states of one or more vehicle systems of the vehicle (e.g., the vehicle 108). For example, the vehicle computing system 112 can access data (e.g., a lookup table) including severity level data that includes one or more states of the vehicle systems and one or more corresponding severity levels. The vehicle computing system 112 can then determine or select the severity level by selecting the portion of the severity level data that corresponds to the one or more states of the one or more vehicle systems.

At 912, the method 900 can include generating, based at least in part on the state data, a motion plan. For example, the vehicle computing system 112 can generate data including the motion plan based on one or more inputs including the state data. The motion plan can include information associated with one or more locations for the vehicle to traverse (e.g., pass by or travel by) over one or more time intervals (e.g., one or more time intervals that are based in part on the division of a longer period of time into the one or more time intervals).

The one or more time intervals can correspond to the one or more locations (e.g., the vehicle will be at each of the locations at a corresponding one of the one or more time intervals). The one or more locations can include a current location of the vehicle (e.g., a first one of the one or more locations) and a destination location (e.g., the last one of the one or more locations) at which the vehicle will stop traveling. Furthermore, the one or more time intervals of the motion plan can correspond to a timing of activating one or more vehicle systems when the motion plan is executed (e.g., a time interval when engine power is decreased, brakes are applied, and/or the vehicle is steered in a particular direction).

In some embodiments, the motion plan can comply with the set of respective constraints associated with the severity level. For example, complying with the set of constraints can include the motion plan that is generated complying with one or more time constraints (e.g., a time duration before the vehicle comes to a stop), distance constraints (e.g., a maximum distance within which the vehicle will come to a stop), trajectory change constraints (e.g., an amount by which the trajectory of the vehicle can change before the vehicle stops), and/or location constraints (e.g., areas where the vehicle is constrained from traversing).

In some embodiments, generating the motion plan can include selecting a motion plan from a plurality of motion plans (e.g., selecting one of a plurality of motion plans). For example, the vehicle computing system 112 can access and select a motion plan from motion plan data that includes a plurality of motion plans. The plurality of motion plans can include stopping the vehicle within a first threshold time period (e.g., a threshold time period of a tenth of a second for emergency situations) or within a first threshold distance (e.g., a threshold distance less than the distance to a detected object external to the vehicle) without changing a trajectory of the vehicle (e.g., stopping the vehicle in a straight line of travel); changing the trajectory of the vehicle (e.g., changing the direction of travel of the vehicle) and stopping the vehicle before a second threshold time period (e.g., bringing the vehicle to a stop in less than five seconds when a windshield is cracked) or a second threshold distance (e.g., stopping the vehicle at a road side within one kilometer of the vehicle's current location); or changing the trajectory of the vehicle and stopping the vehicle after the second threshold time period (e.g., bringing the vehicle to a stop thirty minutes after determining that the vehicle's fuel will be depleted within forty five minutes and that the nearest fueling station is thirty minutes away) or the second threshold distance (e.g., stopping the vehicle two kilometers after estimating that the vehicle's fuel will be depleted in five kilometers). In some embodiments, the plurality of motion plans can include any number or amount of time ranges and/or thresholds and/or distance ranges and/or thresholds.

At 914, the method 900 can include activating, based at least in part on the motion plan, one or more vehicle systems associated with operation of the vehicle. The one or more vehicle systems can include one or more engine systems, one or more motor systems, one or more steering systems, one or more braking systems, one or more electrical systems, and/or one or more lighting systems.

For example, the vehicle computing system 112 can, activate one or more vehicle systems including notification systems (e.g., playing a message on an in-vehicle speaker system to indicate that the vehicle is stopping due to an issue with the vehicle's electrical system); illumination systems (e.g., turning on hazard lights when the vehicle pulls over to the side of the road); communication systems (e.g., opening a communication channel for one or more passengers of the vehicle to communicate); braking systems (e.g., apply the vehicle's brakes when a trunk of the vehicle is opened during vehicle transit); propulsion systems (e.g., reducing the vehicle's velocity when the vehicle travels to a road shoulder); and/or steering systems (e.g., steering the vehicle to a new destination location).

Figure 10:
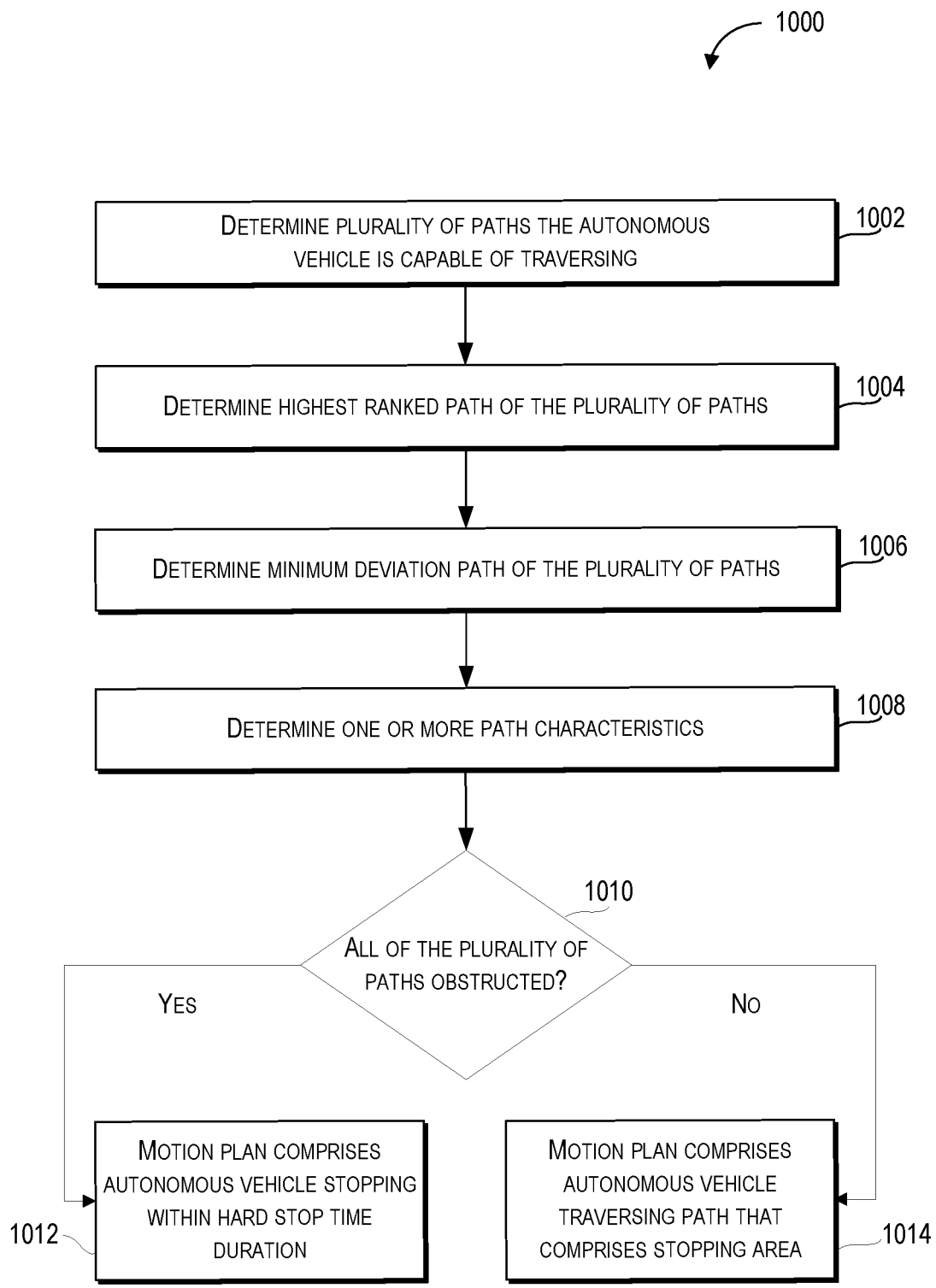
FIG. 10 depicts a flow diagram of an example method of autonomous vehicle operation according to example embodiments of the present disclosure.

FIG. 10 depicts a flow diagram of an example method of autonomous vehicle operation according to example embodiments of the present disclosure. One or more portions of a method 1000 can be implemented by one or more devices (e.g., one or more computing devices) or systems including, for example, the operations computing system 104, the vehicle 108, or the vehicle computing system 112, shown in FIG. 1. Moreover, one or more portions of the method 1000 can be implemented as an algorithm on the hardware components of the devices described herein (e.g., as in FIG. 1) to, for example, generate a motion plan for a vehicle based on the determination that one or more vehicle stoppage conditions have occurred. FIG. 10 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1002, the method 1000 can include determining (e.g., determining based at least in part on the state data of the method 900) a plurality of paths the vehicle (e.g., the vehicle 108) is capable of traversing from the current location of the vehicle within the aggregate duration of the one or more time intervals. Traversal of each of the plurality of paths can include stopping at a terminal location of each of the plurality of paths respectively. For example, the vehicle computing system 112 can determine that the rear visibility of the vehicle has been reduced due to a malfunction in a suite of cameras at the rear of the vehicle. The vehicle computing system 112 can then determine that the aggregate duration of the one or more time intervals for the vehicle to come to a stop is ten seconds. Based on an estimated deceleration of the vehicle and the availability of locations to stop the vehicle, the vehicle can determine the plurality of paths that the vehicle can traverse before stopping.

In some embodiments, generating the motion plan (e.g., the motion plan of the method 900) can include determining at least one path of the plurality of paths that the vehicle is capable of traversing from the current location of the vehicle within the aggregate duration of the one or more time intervals.

At 1004, the method 1000 can include determining (e.g., determining based at least in part on the state data of the method 900) a highest ranked path of the plurality of paths based at least in part on one or more path criteria associated with one or more adverse conditions for the autonomous vehicle to avoid. For example, the vehicle computing system 112 can determine a ranking of the plurality of paths based at least in part on one or more path criteria associated with one or more adverse conditions for the vehicle to avoid.

By way of further example, the vehicle computing system 112 can analyze (e.g., analyze based in part on the state data) each of the plurality of paths based in part on the one or more path criteria. Analyzing each of the plurality of paths can include determining which of the plurality of paths include the one or more adverse conditions and/or the extent to which each of the one or more adverse conditions is present in each of the plurality of paths. The plurality of paths can then be ranked (e.g., arranged in an ascending or descending order according to the extent to which the one or more path criteria that are satisfied).

The one or more adverse conditions can include a body of water deeper than a threshold depth, a sidewalk, a prohibited area (e.g., a no-parking zone), a road with a direction of travel opposite to a direction of travel of the autonomous vehicle, an area in front of an emergency vehicle area (e.g., a fire station or a hospital ambulance entryway), an intersection, a railroad crossing, a public transportation pick-up area (e.g., a streetcar station), a blind curve, a blind corner, an on-ramp for a highway, and/or an off-ramp for a highway.

In some embodiments, generating the motion plan (e.g., the motion plan of the method 900) can include determining highest ranked path of the plurality of paths based at least in part on one or more path criteria associated with one or more adverse conditions for the autonomous vehicle to avoid.

At 1006, the method 1000 can include determining (e.g., determining based at least in part on the state data of the method 900) a minimum deviation path of the plurality of paths. The minimum deviation path can include the path of the plurality of paths that includes a least amount of change to a velocity, acceleration, and/or a trajectory of the vehicle. For example, the vehicle computing system 112 can determine a straightest path (e.g., minimizing change in vehicle trajectory) between the current location of a vehicle and a destination location of the vehicle that does not bring the vehicle into contact with any objects other than the road surface.

In some embodiments, generating the motion plan (e.g., the motion plan of the method 900) can include determining the minimum deviation path of the plurality of paths.

At 1008, the method 1000 can include determining (e.g., determining based at least in part on the state data of the method 900) one or more path characteristics for each of the plurality of paths. The one or more path characteristics can include various aspects, attributes, and/or characteristics for each of the plurality of paths. The one or more path characteristics can include a path distance, a path angle (e.g., an angle of the path with respect to the vehicle and/or other objects in the environment), a path grade (e.g., a slope or incline of the road), a path width, a path surface type (e.g., cement, paved, unpaved, gravel, and/or dirt), a path surface condition (e.g., wet, dry, and/or snow covered), a curb size (e.g., the height and/or width of a curb), a path shoulder size (e.g., the length and/or width of a path shoulder including a road shoulder), and/or a path shoulder type (e.g., paved or unpaved). In some embodiments, generating the motion plan (e.g., the motion plan of the method 900) can include determining the one or more path characteristics for each of the plurality of paths.

At 1010, the method 1000 can include determining (e.g., determining based at least in part on the state data of the method 900) whether, when, or that, any or all of the plurality of paths are obstructed (e.g., a path of the plurality of paths has an obstruction that prevents the vehicle from traveling the length of the path). For example, the vehicle computing system 112 can use data including the state data and data from an external source (e.g., map data from a remote map data provider or traffic light data from a traffic signal system) to determine whether, when, or that, any or all of the plurality of paths are obstructed.

Responsive to all of the paths being obstructed, the method 1000 can proceed to 1012. Responsive to all of the plurality of paths not being obstructed (e.g., at least one path of the plurality of paths is unobstructed), the method 1000 can proceed to 1014.

At 1012, the method 1000 can include, determining, based at least in part on the state data (e.g., the state data of the method 900), a hard stop time duration for the vehicle to stop without changing a trajectory of the vehicle. In some embodiments, determining, based at least in part on the state data, a hard stop time duration for the vehicle to stop without changing a trajectory of the vehicle can be responsive to all of the plurality of paths being obstructed.

In some embodiments, the hard stop time duration can be based in part on the severity level of the one or more vehicle stoppage conditions. For example, the vehicle computing system 112 can determine that the vehicle is obstructed in the front, back, and left by other vehicles, and obstructed on the right by a concrete lane divider. The vehicle computing system 112 can then determine that the vehicle will not change trajectory (e.g., not execute a turn) and will stop within a hard stop time duration (e.g., less than one second).

In some embodiments, generating the motion plan (e.g., the motion plan of the method 900) can include determining, based at least in part on the state data, a hard stop time duration for the autonomous vehicle to stop without changing a trajectory of the autonomous vehicle or determining that the vehicle will stop without changing trajectory within the hard stop time duration.

At 1014, the method 1000 can include, responsive to at least one of the plurality of paths not being obstructed, determining, based at least in part on the state data (e.g., the state data of the method 900), a path of the plurality of paths that includes an area of predetermined size at which the vehicle can stop. For example, the vehicle computing system 112 can determine that two paths of the plurality of paths are not obstructed and that an area of predetermined size for the vehicle is six meters wide and twenty-five meters long. Further, the vehicle computing system 112 can determine that one of the two paths passes through a tunnel with that is six meters high (the tunnel can accommodate the vehicle, which is a truck), and the other path is on a road with a road shoulder that has a stopping area six meters wide by thirty meters long (which exceeds the predetermined size of four meters width and twenty-five meters long) and immediately adjacent to the road. In some embodiments, the size of the predetermined area is based in part on the size of the vehicle (e.g., the physical dimensions of the vehicle) and can include an additional clearance area around the vehicle (e.g., extra height, length, or width).

In some embodiments, generating the motion plan (e.g., the motion plan of the method 900) can include determining, based at least in part on the state data, the path of the plurality of paths that includes the area of predetermined size at which the vehicle can stop.

Figure 11:
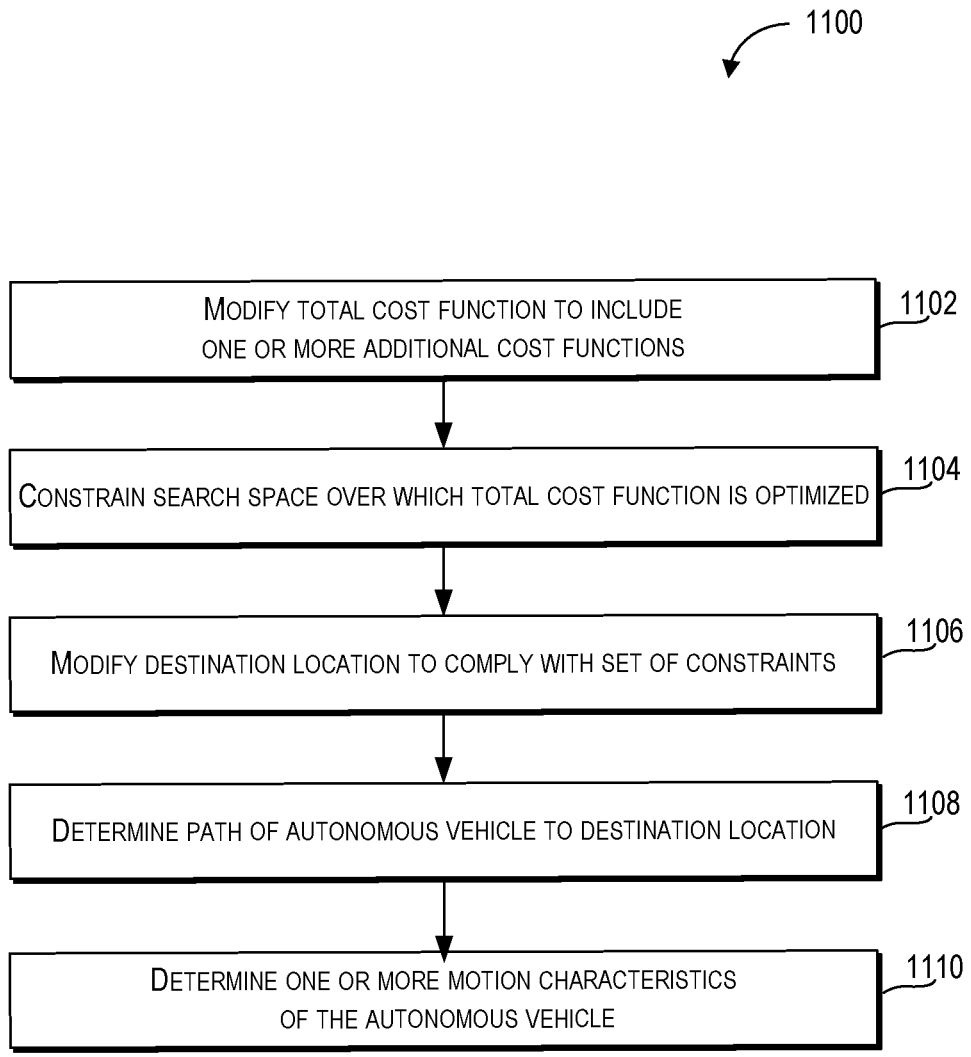
FIG. 11 depicts a flow diagram of an example method of autonomous vehicle operation according to example embodiments of the present disclosure.

FIG. 11 depicts a flow diagram of an example method of autonomous vehicle operation according to example embodiments of the present disclosure. One or more portions of a method 1100 can be implemented by one or more devices (e.g., one or more computing devices) or systems including, for example, the operations computing system 104, the vehicle 108, or the vehicle computing system 112, shown in FIG. 1. Moreover, one or more portions of the method 1100 can be implemented as an algorithm on the hardware components of the devices described herein (e.g., as in FIG. 1) to, for example, generate a motion plan for a vehicle based on the determination that one or more vehicle stoppage conditions have occurred. FIG. 11 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. For example, in some embodiments, a computing system can select and perform only one of blocks 1102, 1104, or 1106 based on a selected severity level.

At 1102, the method 1100 can include modifying a total cost function to include one or more additional cost functions that respectively enforce the set of constraints associated with the selected severity level (e.g., the severity level of the one or more vehicle stoppage conditions of the method 900). For example, the vehicle computing system 112 can generate a cost based on a total cost function that is a summation of the costs produced by one or more additional cost functions.

By way of further example, the one or more additional cost functions can include a cost function for proximity to an object (e.g., cost increases as proximity to an object decreases), a cost function for the aggregate duration of the one or more time intervals (e.g., cost increases as the aggregate duration of the one or more time intervals increases), and/or a cost function for distance to a destination location (e.g., cost increases as distance to the destination location increases).

Furthermore, the one or more additional cost functions included in the total cost function can be weighted (e.g., some of the one or more additional cost functions more heavily contribute to the total cost function than others). In some embodiments, generating the motion plan (e.g., the motion plan of the method 900) can include modifying the total cost function to include one or more additional cost functions that respectively enforce the set of constraints associated with the selected severity level.

At 1104, the method 1100 can include constraining a search space over which a motion planning system (e.g., a motion planning system of the vehicle computing system 112) optimizes a total cost function. For example, constraining the search space can include constraining the area (e.g., a radius around the vehicle or a set of locations that determine the boundary of the area) within which the vehicle will travel when the motion plan is executed. Further, constraining the search space can include limiting the type or the amount of the additional cost functions that are used to determine the total cost function. For example, the total cost function can be based on a subset of the one or more additional cost functions. In some embodiments, generating the motion plan (e.g., the motion plan of the method 900) can include constraining the search space over which the motion planning system optimizes a total cost function.

At 1106, the method 1100 can include modifying the destination location (e.g., the destination location in the method 900) to comply with the set of constraints. For example, the destination location at which the vehicle stops can be modified, by the vehicle computing system 112, to comply with a set of constraints associated with the one or more location of one or more objects that obstruct the vehicle. The destination location can be modified so that the vehicle does not come within a threshold distance of the one or more objects. In some embodiments, generating the motion plan (e.g., the motion plan of the method 900) can include modifying the destination location to comply with the set of constraints.

At 1108, the method 1100 can include determining a path of the autonomous vehicle to the destination location (e.g., the destination location of the method 900). For example, the vehicle computing system 112 can determine a path including a set of locations at the one or more time intervals starting at the vehicle's current location (e.g., the first location and the first time interval) to the destination location (e.g., the last location and the last time interval) that was modified in accordance with the set of constraints. In some embodiments, generating the motion plan (e.g., the motion plan of the method 900) can include modifying the destination location to comply with the set of constraints and determining a path of the autonomous vehicle to the destination location.

At 1110, the method 1100 can include determining, based at least in part on the state data (e.g., the state data of the method 900), one or more motion characteristics of the vehicle. The one or more motion characteristics of the vehicle can be based at least in part on the location of the vehicle at each of one or more time intervals. For example, the vehicle computing system 112 can determine one or more motion characteristics including a velocity of the vehicle, an acceleration of the vehicle, and/or a trajectory of the vehicle.

In some embodiments, determining the severity level of the one or more vehicle stoppage conditions can be based at least in part on determining, based at least in part on the state data, the one or more motion characteristics of the vehicle. For example, the severity level of vehicle stoppage conditions for a vehicle stopping at a destination location with a wet surface within twenty meters can be greater when the vehicle is traveling at a velocity of fifty kilometers per hour than when the vehicle is traveling at a velocity of twenty kilometers per hour.

Figure 12:
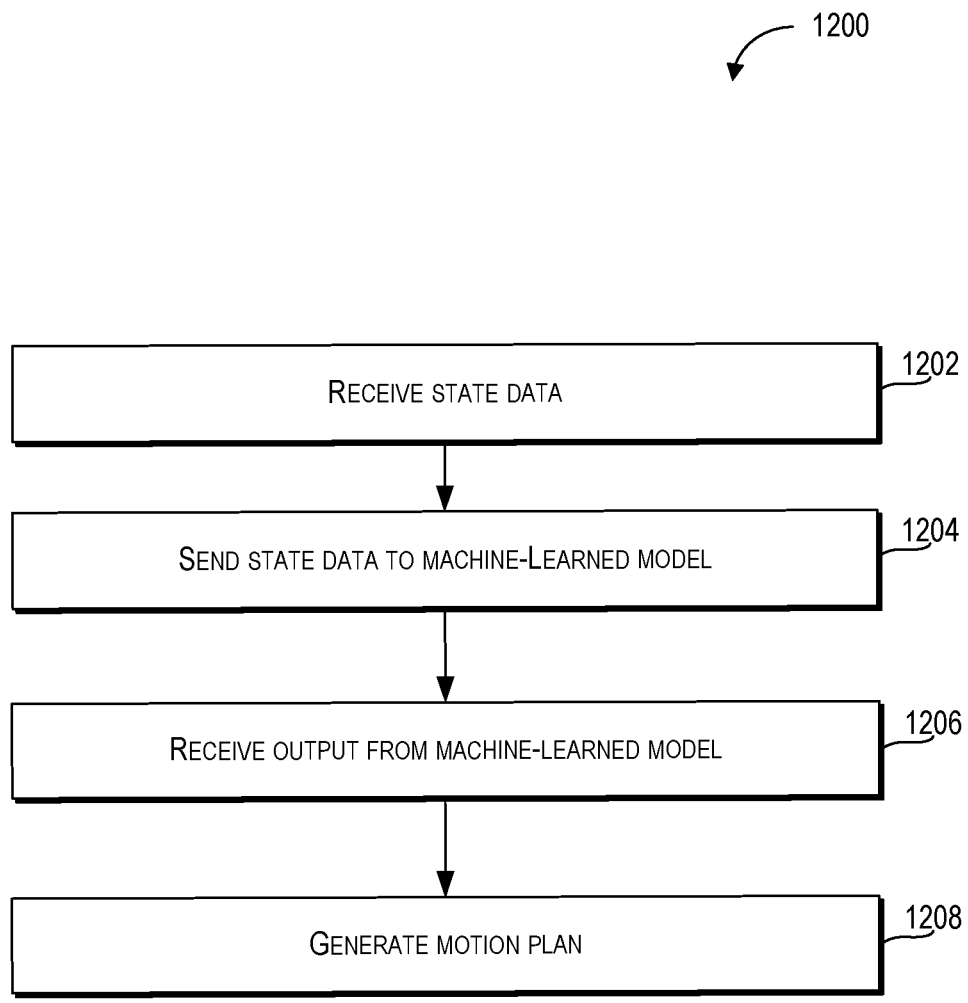
FIG. 12 depicts a flow diagram of an example method of autonomous vehicle operation according to example embodiments of the present disclosure.

FIG. 12 depicts a flow diagram of an example method of autonomous vehicle operation according to example embodiments of the present disclosure. One or more portions of a method 1200 can be implemented by one or more devices (e.g., one or more computing devices) or systems including, for example, the operations computing system 104, the vehicle 108, or the vehicle computing system 112, shown in FIG. 1. Moreover, one or more portions of the method 1200 can be implemented as an algorithm on the hardware components of the devices described herein (e.g., as in FIG. 1) to, for example, generate a motion plan for a vehicle based on the determination that one or more vehicle stoppage conditions have occurred. FIG. 12 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure.

At 1202, the method 1200 can include receiving state data (e.g., the state data of the method 900). For example, the vehicle computing system 112, the computing system 1310, or the machine learning computing system 1350 can receive the state data. The state data can include information associated with one or more states of a vehicle (e.g., the vehicle 108) and/or one or more states of an environment external to the vehicle. For example, the state data can include data associated with the state of a vehicle (e.g., the vehicle 108) including the velocity, acceleration, trajectory, and/or location of the vehicle; and the state of the environment external to the vehicle, including the location of one or more objects including other vehicles, pedestrians, cyclists, buildings, roads, road markings, road signs, and or traffic lights.

At 1204, the method 1200 can include sending the state data (e.g., the state data of the method 900) to a machine-learned model (e.g., a machine-learned vehicle and environment state model). For example, the state data can be sent to the machine-learned model via a wired and/or wireless communication channel. The machine-learned model can be trained to receive an input including data (e.g., the state data) and, responsive to receiving the input, generate an output including information associated with the occurrence of one or more vehicle stoppage conditions in a vehicle (e.g., the vehicle 108) or an environment external to the vehicle. The machine-learned model can include some or all of the features of the vehicle computing system 112, one or more machine-learned models 1330, and/or the one or more machine-learned models 1370.

For example, the machine-learned model can be implemented on a computing system (e.g., the vehicle computing system 112) associated with the vehicle (e.g., the vehicle 108) and can be configured to receive the state data via one or more communication networks (e.g., the communication network 102). For instance, the vehicle computing system 112 can include, employ, and/or otherwise leverage a machine-learned object detection and prediction model that can be used to generate a motion plan for a vehicle. The machine-learned object detection and prediction model can be or can otherwise include one or more various models including, for example, neural networks (e.g., deep neural networks), or other multi-layer non-linear models.

Neural networks can include convolutional neural networks, recurrent neural networks (e.g., long short-term memory recurrent neural networks), feed-forward neural networks, and/or other forms of neural networks. For instance, supervised training techniques can be performed to train the machine-learned object detection and prediction model to detect and/or predict an interaction between: one or more passengers of the vehicle and the vehicle (e.g., the vehicle 108); a first object (e.g., the vehicle 108) and one or more second objects (e.g., objects external to the vehicle 108); and/or the associated predicted interactions (e.g., using labeled driving log data, state data, and/or passenger experience data with known instances of interactions).

In some implementations, training data for the machine-learned object detection and prediction model can be based at least in part on the predicted interaction outcomes determined using a rules-based model, that can be used to help train the machine-learned object detection and prediction model to detect and/or predict one or more interactions between the vehicle, the passengers, and/or one or more objects. Further, the training data can be used to train the machine-learned object detection and prediction model offline.

In some embodiments, the vehicle computing system 112 can input the state data into the machine-learned object detection and prediction model and receive an output. For instance, the vehicle computing system 112 can obtain data indicative of a machine-learned object detection and prediction model from an accessible memory onboard the vehicle 108 and/or from a memory that is remote from the vehicle 108 (e.g., via a wireless network). Further, the vehicle computing system 112 can send state data to the machine-learned object detection and prediction model. The state data can include the data associated with the state of the vehicle, the state of one or more passengers of the vehicle, and the state of one or more objects external to the vehicle including one or more vehicles, pedestrians, cyclists, buildings, and/or environments associated with the one or more objects (e.g., roads, road markings, road signs, traffic lights, bodies of water, hills, mountains, and/or forests).

The machine-learned object detection and prediction model can process the state data to predict an interaction associated with an object (e.g., a passenger-vehicle interaction, an object-object interaction, and/or an object-vehicle interaction). Further, the vehicle computing system 112 can obtain an output from the machine-learned object detection and prediction model.

The output from the machine-learned object detection and prediction model can be indicative of the one or more predicted interactions (e.g., a plurality of motion plans including paths that the vehicle can traverse without contacting the one or more objects before coming to a stop). For example, the output can be indicative of the one or more predicted interactions within an environment. In some implementations, the vehicle computing system 112 can provide state data indicative of the predicted interaction and the machine-learned object detection and prediction model can output the predicted interactions based on such state data. In some implementations, the output can also be indicative of a probability associated with each respective interaction.

At 1206, the method 1200 can include receiving output including information associated with the occurrence of one or more vehicle stoppage conditions from the machine-learned model. The one or more vehicle stoppage conditions can include and/or describe a severity level selected from a plurality of available severity levels (e.g., the severity levels of the method 900). For example, the vehicle computing system 112 can use the one or more vehicle stoppage conditions to determine and/or select the severity level from severity level data that includes the plurality of available severity levels each of which is associated with a corresponding one of the one or more vehicle stoppage conditions.

By way of further example, selecting the severity level of the plurality of available severity levels can include the vehicle computing system 112 accessing data (e.g., a lookup table) that includes severity level data. The severity level data can include one or more states of the vehicle systems, and/or one or more states of the environment external to the vehicle, each of which can be associated with the plurality of available severity levels. The vehicle computing system 112 can then select one severity level of the plurality of available severity levels by selecting the portion of the severity level data that corresponds to the one or more states of the one or more vehicle systems and/or one or more states of the environment external to the vehicle.

Further, a plurality of sets of constraints can be respectively associated with the plurality of available severity levels. In some embodiments, the plurality of sets of constraints can be used to constrain one or more portions of a motion plan generated based in part on the output from the machine-learned model.

For example, the plurality of sets of constraints can be associated with the plurality of available severity levels including a time constraint (e.g., the vehicle will stop within the period of time defined by the time constraint), a velocity constraint (e.g., a maximum velocity of the vehicle at each of a corresponding plurality of time intervals of the motion plan before the vehicle stops), a deceleration constraint (e.g., a maximum deceleration of the vehicle at each of a corresponding plurality of time intervals of the motion plan before the vehicle stops), a trajectory change constraint (e.g., an extent or amount of trajectory change by the vehicle at each of a corresponding plurality of time intervals of the motion plan before the vehicle stops), and/or a location constraint (e.g., locations the vehicle will not traverse and/or locations that are not included in a travel path of the vehicle).

At 1208, the method 1200 can include generating, based at least in part on the output including the information associated with the occurrence of one or more vehicle stoppage conditions from the machine-learned model, a motion plan that complies with a set of constraints associated with the severity level (e.g., the severity level selected by the machine-learned model from the plurality of available severity levels). The motion plan can include information associated with one or more locations for the vehicle to traverse over one or more time intervals corresponding to the one or more locations. Further, the one or more locations can include a current location of the vehicle and a destination location (e.g., a destination location to which the vehicle travels) at which the vehicle will stop traveling. For example, the vehicle computing system 112 can generate motion plan data including one or more plans for the vehicle 108 including one or more locations for the vehicle 108 to traverse at one or more corresponding time intervals.

In some embodiments, generating the motion plan (e.g., the motion plan of the method 900) can include, be associated with, and/or be based in part on one or more portions of the motion plan generated, based at least in part on the one or more vehicle stoppage conditions output from the machine-learned model (e.g., the motion plan of the method 1200).

Figure 13:
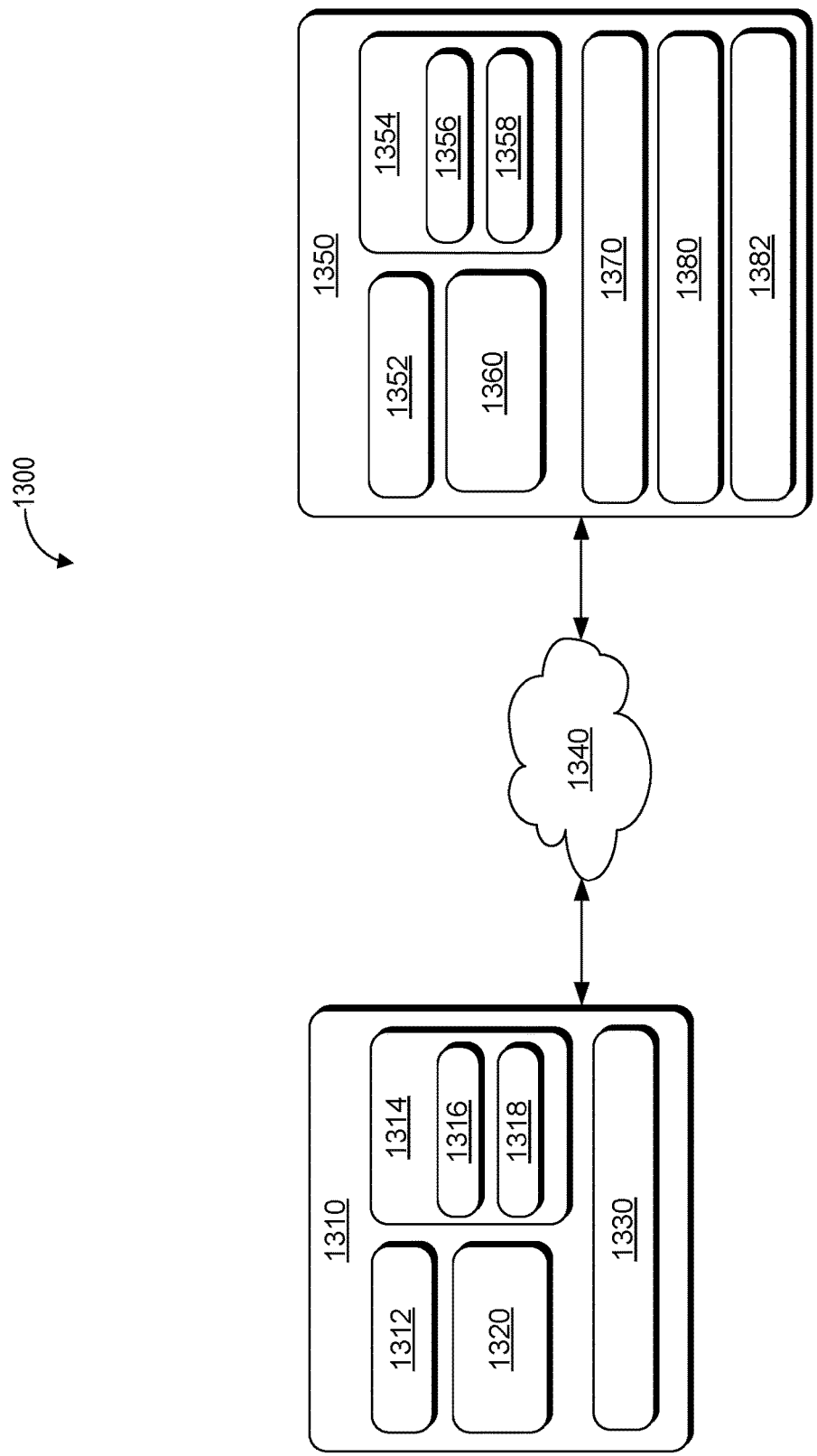
FIG. 13 depicts an example system according to example embodiments of the present disclosure.

FIG. 13 depicts a block diagram of an example computing system 1300 according to example embodiments of the present disclosure. The example computing system 1300 includes a computing system 1310 and a machine learning computing system 1350 that are communicatively coupled over a network 1340. Moreover, the computing system 1300 can include one or more features, functions, devices, elements, and/or components of the system 100 and can perform one or more of the techniques, functions, and/or operations described herein.

In some implementations, the computing system 1310 can perform various operations including the determination of one or more states of a vehicle (e.g., the vehicle 108) including the vehicle's location, position, orientation, velocity, acceleration, and/or trajectory; the determination of one or more states of one or more objects inside the vehicle (e.g., one or more passengers and/or cargo of the vehicle); and/or the determination of the state of the environment proximate to the vehicle including the state of one or more objects proximate to the vehicle (e.g., the one or more objects physical dimensions, location, position, orientation, velocity, acceleration, trajectory, shape, and/or color). In some implementations, the computing system 1310 can be included in an autonomous vehicle. For example, the computing system 1310 can be on-board the autonomous vehicle. In other implementations, the computing system 1310 is not located on-board the autonomous vehicle. For example, the computing system 1310 can operate offline to determine one or more states of a vehicle (e.g., the vehicle 108) including the vehicle's location, position, orientation, velocity, acceleration, and/or trajectory; determine one or more states of one or more objects inside the vehicle (e.g., one or more passengers and/or cargo inside the vehicle); and/or determine the state of the environment external to the vehicle including the state of one or more objects proximate to the vehicle (e.g., the one or more objects physical dimensions, location, position, orientation, velocity, acceleration, trajectory, shape, and/or color). Further, the computing system 1310 can include one or more distinct physical computing devices.

The computing system 1310 includes one or more processors 1312 and a memory 1314. The one or more processors 1312 can include any suitable processing device (e.g., a processing device including one or more of a processor core, a microprocessor, an application specific integrated circuit (ASIC), a field programmable gate array (FPGA), a controller, and/or a microcontroller) and can include one processor or a plurality of processors that are operatively connected. The memory 1314 can include one or more non-transitory computer-readable storage media, including Random access memory (e.g., RAM), Read-only memory (ROM), electronically erasable programmable read-only memory (EEPROM), erasable programmable read-only memory (EPROM), non-volatile random access memory (NVRAM), one or more memory devices, flash memory devices, and/or any combinations thereof.

The memory 1314 can store information that can be accessed by the one or more processors 1312. For instance, the memory 1314 (e.g., one or more non-transitory computer-readable storage mediums, memory devices) can store data 1316 that can be obtained, received, accessed, written, manipulated, created, and/or stored. The data 1316 can include, for instance, data associated with the state of a vehicle; the environment external to the vehicle (e.g., the state of one or more objects external to the vehicle); and/or a motion plan for the vehicle as described herein. In some implementations, the computing system 1310 can obtain data from one or more memory devices that are remote from the system 1310.

The memory 1314 can also store computer-readable instructions 1318 that can be executed by the one or more processors 1312. The instructions 1318 can be software written in any suitable programming language or can be implemented in hardware. Additionally, or alternatively, the instructions 1318 can be executed in logically and/or virtually separate threads on the one or more processors 1312.

For example, the memory 1314 can store instructions 1318 that when executed by the one or more processors 1312 cause the one or more processors 1312 to perform any of the operations and/or functions described herein, including, for example, determining the state of a vehicle (e.g., the vehicle 108); determining the state of the environment external to the vehicle (e.g., the physical dimensions of one or more objects in the environment external to the vehicle); and or generating a motion plan for the vehicle.

According to an aspect of the present disclosure, the computing system 1310 can store or include one or more machine-learned models 1330. As examples, the one or more machine-learned models 1330 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

In some implementations, the computing system 1310 can receive the one or more machine-learned models 1330 from the machine learning computing system 1350 over the network 1340 and can store the one or more machine-learned models 1330 in the memory 1314. The computing system 1310 can then use or otherwise implement the one or more machine-learned models 1330 (e.g., by the one or more processors 1312). In particular, the computing system 1310 can implement the one or more machine-learned models 1330 to determine a state of a vehicle (e.g., the vehicle 108); determine a state of the environment external to the vehicle (e.g., the physical dimensions of one or more objects in the environment external to the vehicle); and/or generate a motion plan for the vehicle.

The machine learning computing system 1350 includes one or more processors 1352 and a memory 1354. The one or more processors 1352 can be any processing device (e.g., a processing device including one or more of a processor core, a microprocessor, an ASIC, a FPGA, a controller, and/or a microcontroller) and can be one processor or a plurality of processors that are operatively connected. The memory 1354 can include one or more non-transitory computer-readable storage media, such as RAM, ROM, EEPROM, EPROM, NVRAM, one or more memory devices, flash memory devices, and/or any combinations thereof.

The memory 1354 can store information that can be accessed by the one or more processors 1352. For instance, the memory 1354 (e.g., one or more non-transitory computer-readable storage mediums, memory devices) can store data 1356 that can be obtained, received, accessed, written, manipulated, created, and/or stored. The data 1356 can include, for instance, information associated with a state of a vehicle (e.g., the vehicle 108); a state of the environment external to the vehicle; and/or a motion plan for the vehicle as described herein. In some implementations, the machine learning computing system 1350 can obtain data from one or more memory devices that are remote from the system 1350.

The memory 1354 can also store computer-readable instructions 1358 that can be executed by the one or more processors 1352. The instructions 1358 can be software written in any suitable programming language or can be implemented in hardware. Additionally, or alternatively, the instructions 1358 can be executed in logically and/or virtually separate threads on the one or more processors 1352.

For example, the memory 1354 can store instructions 1358 that when executed by the one or more processors 1352 cause the one or more processors 1352 to perform any of the operations and/or functions described herein, including, for example, determining a state of a vehicle (e.g., the vehicle 108); determining a state of the environment external to the vehicle; and/or generating a motion plan for the vehicle.

In some implementations, the machine learning computing system 1350 includes one or more server computing devices. In implementations in which the machine learning computing system 1350 includes multiple server computing devices, such server computing devices can operate according to various computing architectures, including, for example, sequential computing architectures, parallel computing architectures, or some combination thereof.

In addition or alternatively to the one or more machine-learned models 1330 at the computing system 1310, the machine learning computing system 1350 can include one or more machine-learned models 1370. As examples, the one or more machine-learned models 1370 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks, recurrent neural networks (e.g., long short-term memory recurrent neural networks), convolutional neural networks, or other forms of neural networks.

As an example, the machine learning computing system 1350 can communicate with the computing system 1310 according to a client-server relationship. For example, the machine learning computing system 1350 can implement the one or more machine-learned models 1370 to provide a web service to the computing system 1310. For example, the web service can provide a state of a vehicle (e.g., the vehicle 108); a state of the environment external to the vehicle; and/or a motion plan associated with the vehicle.

Further, the one or more machine-learned models 1330 can be located and used at the computing system 1310 and/or one or more machine-learned models 1370 can be located and used at the machine learning computing system 1350. In some implementations, the machine learning computing system 1350 and/or the computing system 1310 can train the one or more machine-learned models 1330 and/or the one or more machine-learned models 1370 through use of a model trainer 1380. The model trainer 1380 can train the one or more machine-learned models 1330 and/or the one or more machine-learned models 1370 using one or more training or learning algorithms. One example training technique is backwards propagation of errors. In some implementations, the model trainer 1380 can perform supervised training techniques using a set of labeled training data. In other implementations, the model trainer 1380 can perform unsupervised training techniques using a set of unlabeled training data. The model trainer 1380 can perform a number of generalization techniques to improve the generalization capability of the models being trained. Generalization techniques include weight decays, dropouts, or other techniques.

In particular, the model trainer 1380 can train a machine-learned model 1330 and/or the one or more machine-learned models 1370 based on a set of training data 1382. The training data 1382 can include, for example, a plurality of objects including vehicle objects, passenger objects, cyclist objects, road sign objects, road marker objects, traffic light objects, building objects, and/or road objects. The model trainer 1380 can be implemented in hardware, firmware, and/or software controlling one or more processors.

The computing system 1310 can also include a network interface 1320 used to communicate with one or more systems or devices, including systems or devices that are remotely located from the computing system 1310. The network interface 1320 can include any circuits, components, and/or software, for communicating with one or more networks (e.g., the network 1340). In some implementations, the network interface 1320 can include, for example, one or more of a communications controller, receiver, transceiver, transmitter, port, conductors, software and/or hardware for communicating data. Similarly, the machine learning computing system 1350 can include a network interface 1360.

The network 1340 can be any type of one or more network or combination of networks that allows for communication between devices. In some embodiments, the one or more networks can include one or more of a local area network, wide area network, the Internet, secure network, cellular network, mesh network, peer-to-peer communication link and/or some combination thereof and can include any number of wired or wireless links. Communication over the network 1340 can be accomplished, for instance, via a network interface using any type of protocol, protection scheme, encoding, format, and/or packaging.

FIG. 13 illustrates one example computing system 1300 that can be used to implement the present disclosure. Other computing systems can be used as well. For example, in some implementations, the computing system 1310 can include the model trainer 1380 and the training dataset 1382. In such implementations, the one or more machine-learned models 1330 can be both trained and used locally at the computing system 1310. As another example, in some implementations, the computing system 1310 is not connected to other computing systems.

In addition, components illustrated and/or discussed as being included in one of the computing systems 1310 or 1350 can instead be included in another of the computing systems 1310 or 1350. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method of autonomous vehicle operation, the computer-implemented method comprising:
   receiving, by a computing system comprising one or more computing devices, state data comprising information associated with at least one of: one or more states of an autonomous vehicle or one or more states of an environment external to the autonomous vehicle;
   determining, by the computing system, that one or more vehicle stoppage conditions are satisfied based at least in part on the state data, wherein each of the one or more vehicle stoppage conditions is a condition that indicates that the autonomous vehicle is to stop traveling;
   selecting, by the computing system based at least in part on the state data and a machine-learned model, a severity level for the one or more satisfied vehicle stoppage conditions from a plurality of available severity levels,
   wherein the machine-learned model is trained to select the severity level based at least in part on the one or more satisfied vehicle stoppage conditions, the severity level indicating an immediacy with which the autonomous vehicle is to stop traveling;
   generating, by the computing system, a motion plan based at least in part on the severity level; and
   controlling, by the computing system, autonomous driving of the autonomous vehicle in accordance with the motion plan.

2. The computer-implemented method of claim 1, wherein selecting the severity level comprises:
   determining, by the computing system, one or more motion characteristics of the autonomous vehicle based at least in part on the state data, the one or more motion characteristics comprising at least one of a velocity, an acceleration, or a trajectory of the autonomous vehicle.

3. The computer-implemented method of claim 1, wherein the severity level is inversely proportional to at least one of: a distance between a current location of the autonomous vehicle and a destination location, an amount of change in a velocity of the autonomous vehicle, an amount of change in an acceleration of the autonomous vehicle, or an amount of change in a trajectory of the autonomous vehicle.

4. The computer-implemented method of claim 1, wherein generating the motion plan comprises:
   generating the motion plan for the autonomous vehicle to comply with one or more constraints associated with the severity level.

5. The computer-implemented method of claim 4, wherein generating the motion plan for the autonomous vehicle to comply with the one or more constraints associated with the severity level comprises:
   determining, by the computing system, whether the autonomous vehicle is capable of traversing, from a current location within one or more time intervals, at least one of a plurality of paths based at least in part on the state data, the traversal comprising stopping at a terminal location of each of the at least one of the plurality of paths, respectively.

6. The computer-implemented method of claim 5, wherein generating the motion plan to comply with the one or more constraints associated with the severity level comprises:
   determining, by the computing system, a highest ranked path of the plurality of paths based at least in part on one or more path criteria associated with one or more adverse conditions for the autonomous vehicle to avoid.

7. The computer-implemented method of claim 1, wherein generating the motion plan comprises:
   determining, by the computing system, a path from among a plurality of paths with a minimum deviation.

8. The computer-implemented method of claim 7, wherein the minimum deviation comprises a least amount of change to a velocity, an acceleration, or a trajectory of the autonomous vehicle.

9. The computer-implemented method of claim 1, wherein generating the motion plan comprises:
   in response to at least one of a plurality of paths not being obstructed, determining, by the computing system, a path of the plurality of paths that comprises an area of predetermined size at which the vehicle can stop.

10. The computer-implemented method of claim 1, wherein generating the motion plan comprises:
    constraining, by the computing system, a search space over which the autonomous vehicle optimizes a cost function.

11. The computer-implemented method of claim 1, wherein generating the motion plan comprises:
    modifying, by the computing system, a destination location to comply with one or more constraints associated with the severity level; and
    determining, by the computing system, a path of the autonomous vehicle to the destination location.

12. The computer-implemented method of claim 1, wherein the motion plan comprises stopping the autonomous vehicle without changing a trajectory of the autonomous vehicle within a first threshold time period or a first threshold distance, changing the trajectory of the autonomous vehicle and stopping the autonomous vehicle before a second time period or a second threshold distance, or changing the trajectory of the autonomous vehicle and stopping the autonomous vehicle after the second time period or the second threshold distance.

13. A computing system, comprising: one or more processors; and
  one or more tangible, non-transitory, computer readable media storing instructions that when executed by the one or more processors cause the computing system to perform operations comprising:
  receiving state data comprising information associated with at least one of: one or more states of an autonomous vehicle or one or more states of an environment external to the autonomous vehicle;
  determining that one or more vehicle stoppage conditions are satisfied based at least in part on the state data, wherein each of the one or more vehicle stoppage conditions is a condition that indicates that the autonomous vehicle is to stop traveling;
  selecting, based at least in part on the state data and a machine-learned model, a severity level for the one or more satisfied vehicle stoppage conditions from a plurality of available severity levels,
  wherein the machine-learned model is trained to select the severity level based at least in part on the one or more satisfied vehicle stoppage conditions, the severity level indicating an immediacy with which the autonomous vehicle is to stop traveling;
  generating a motion plan based at least in part on the severity level; and
  controlling autonomous driving of the autonomous vehicle in accordance with the motion plan.

14. The computing system of claim 13, wherein the selected severity level is associated with a surface on which the autonomous vehicle is to stop.

15. The computing system of claim 13, wherein generating the motion plan comprises:
  generating the motion plan for the autonomous vehicle to comply with one or more constraints associated with the severity level.

16. The computing system of claim 15, wherein generating the motion plan for the autonomous vehicle to comply with one or more constraints associated with the severity level comprises:
  modifying a destination location of the autonomous vehicle to comply with the one or more constraints associated with the severity level.

17. The computing system of claim 13, wherein generating the motion plan comprises:
  determining a path, of a plurality of paths, for the autonomous vehicle to follow to stop the autonomous vehicle.

18. The computing system of claim 13, wherein the one or more states of the environment external to the autonomous vehicle are based at least in part on sensor data received via one or more sensors of the autonomous vehicle.

19. The computing system of claim 13, wherein the one or more states of the environment external to the autonomous vehicle comprise at least one of a location, a size, or a position of an object within the environment.

20. An autonomous vehicle, comprising:
  one or more processors; and
  one or more tangible, non-transitory, computer readable media storing instructions that when executed by the one or more processors cause the autonomous vehicle to perform operations comprising:
  receiving state data comprising information associated with at least one of: one or more states of an autonomous vehicle or one or more states of an environment external to the autonomous vehicle;
  determining that one or more vehicle stoppage conditions are satisfied based at least in part on the state data, wherein each of the one or more vehicle stoppage conditions is a condition that indicates that the autonomous vehicle is to stop traveling;
  selecting, based at least in part on the state data and a machine-learned model, a severity level for the one or more vehicle stoppage conditions from a plurality of available severity levels,
  wherein the machine-learned model is trained to select the severity level based at least in part on the one or more satisfied vehicle stoppage conditions, the severity level indicating an immediacy with which the autonomous vehicle is to stop traveling;
  generating a motion plan based at least in part on the severity level; and
  controlling autonomous driving of the autonomous vehicle in accordance with the motion plan.

21. The autonomous vehicle of claim 20, wherein generating the motion plan comprises:
  modifying a destination location to comply with one or more constraints associated with the severity level; and
  determining a path of the autonomous vehicle to the destination location.

22. The autonomous vehicle of claim 21, further comprising:
  implementing the motion plan for the autonomous vehicle to traverse the path.

* * * * *